(12) United States Patent
Sardella et al.

(10) Patent No.: US 7,254,741 B1
(45) Date of Patent: Aug. 7, 2007

(54) ATTAINING HIGH AVAILABILITY THROUGH A POWER SYSTEM BRANCH ARCHITECTURE

(75) Inventors: Steven D. Sardella, Marlborough, MA (US); Douglas E. Peeke, Shrewsbury, MA (US); Timothy D. Sykes, Berlin, MA (US)

(73) Assignee: EMC Corporation, Hopkinton, MA (US)

( * ) Notice: Subject to any disclaimer, the term of this patent is extended or adjusted under 35 U.S.C. 154(b) by 405 days.

(21) Appl. No.: 10/259,335

(22) Filed: Sep. 27, 2002

(51) Int. Cl.
*G06F 11/00* (2006.01)

(52) U.S. Cl. .......................... 714/6; 714/14

(58) Field of Classification Search ............... 714/6, 714/14; 711/200, 202, 209; 365/230.06, 365/230.01, 230.08, 231
See application file for complete search history.

(56) References Cited

U.S. PATENT DOCUMENTS

| | | | |
|---|---|---|---|
| 4,748,560 A | 5/1988 | Kataoka | 364/200 |
| 5,325,363 A * | 6/1994 | Lui | 714/6 |
| 5,918,241 A * | 6/1999 | Egy | 711/4 |
| 6,351,795 B1 * | 2/2002 | Hagersten | 711/202 |
| 6,389,554 B1 * | 5/2002 | Jung et al. | 714/6 |
| 6,463,504 B1 * | 10/2002 | Ishibashi et al. | 711/114 |
| 6,594,745 B2 * | 7/2003 | Grover | 711/162 |
| 6,651,165 B1 * | 11/2003 | Johnson | 713/2 |
| 6,687,805 B1 * | 2/2004 | Cochran | 711/209 |
| 6,725,302 B1 | 4/2004 | Benayoun et al. | 710/62 |
| 6,813,686 B1 * | 11/2004 | Black | 711/114 |
| 6,820,139 B1 * | 11/2004 | Binford et al. | 710/3 |
| 6,874,100 B2 * | 3/2005 | Rauscher | 714/6 |
| 6,889,345 B2 * | 5/2005 | Sicola et al. | 714/43 |
| 2003/0182501 A1 * | 9/2003 | George et al. | 711/114 |

* cited by examiner

*Primary Examiner*—Scott Baderman
*Assistant Examiner*—Joshua Lohn
(74) *Attorney, Agent, or Firm*—BainwoodHuang

(57) ABSTRACT

High availability is provided in a storage system. The storage system includes a plurality of storage devices having reserved space, for example, for an operating system. Several power branches provide power to the storage devices. At least one of the storage devices is coupled to a first of the power branches, and at least one other storage device is coupled to another of the power branches. Furthermore, each of several devices has a unique address represented by a separate plurality of address bits. Logic produces intermediate bits, the number of intermediate bits being fewer than the number of address bits. The intermediate bits are used to drive the address bits. Some of the intermediate bits drive more than one address bit.

24 Claims, 22 Drawing Sheets

| ENCLOSURE ADDRESS | DRIVE 0 | DRIVE 1 | DRIVE 2 | DRIVE 3 | DRIVE 4 | DRIVE 5 | DRIVE 6 | DRIVE 7 | DRIVE 8 | DRIVE 9 | DRIVE 10 | DRIVE 11 | DRIVE 12 | DRIVE 13 | DRIVE 14 |
|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 |
| 1 | 15 | 16 | 17 | 18 | 19 | 20 | 21 | 22 | 23 | 24 | 25 | 26 | 27 | 28 | 29 |
| 2 | 30 | 31 | 32 | 33 | 34 | 35 | 36 | 37 | 38 | 39 | 40 | 41 | 42 | 43 | 44 |
| 3 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 |
| 5 | 75 | 76 | 77 | 78 | 79 | 80 | 81 | 82 | 83 | 84 | 85 | 86 | 87 | 88 | 89 |
| 6 | 90 | 91 | 92 | 93 | 94 | 95 | 96 | 97 | 98 | 99 | 100 | 101 | 102 | 103 | 104 |
| 7 | 105 | 106 | 107 | 108 | 109 | 110 | 111 | 112 | 113 | 114 | 115 | 116 | 117 | 118 | 119 |

| ENCLOSURE ADDRESS | DRIVE 0 | DRIVE 1 | DRIVE 2 | DRIVE 3 | DRIVE 4 | DRIVE 5 | DRIVE 6 | DRIVE 7 | DRIVE 8 | DRIVE 9 | DRIVE 10 | DRIVE 11 | DRIVE 12 | DRIVE 13 | DRIVE 14 |
|---|---|---|---|---|---|---|---|---|---|---|---|---|---|---|---|
| 0 | 0 | 1 | 2 | 3 | 4 | 5 | 6 | 7 | 8 | 9 | A | B | C | D | E |
| 1 | F | 10 | 11 | 12 | 13 | 14 | 15 | 16 | 17 | 18 | 19 | 1A | 1B | 1C | 1D |
| 2 | 1E | 1F | 20 | 21 | 22 | 23 | 24 | 25 | 26 | 27 | 28 | 29 | 2A | 2B | 2C |
| 3 | 2D | 2E | 2F | 30 | 31 | 32 | 33 | 34 | 35 | 36 | 37 | 38 | 39 | 3A | 3B |
| 4 | 3C | 3D | 3E | 3F | 40 | 41 | 42 | 43 | 44 | 45 | 46 | 47 | 48 | 49 | 4A |
| 5 | 4B | 4C | 4D | 4E | 4F | 50 | 51 | 52 | 53 | 54 | 55 | 56 | 57 | 58 | 59 |
| 6 | 5A | 5B | 5C | 5D | 5E | 5F | 60 | 61 | 62 | 63 | 64 | 65 | 66 | 67 | 68 |
| 7 | 69 | 6A | 6B | 6C | 6D | 6E | 6F | 70 | 71 | 72 | 73 | 74 | 75 | 76 | 77 |

FIG. 8

CHART 1

| | DRIVE 0 (BIT A) | DRIVE 0 (BIT B) | DRIVE 0 (BIT C) | DRIVE 0 (BIT D) | DRIVE 0 (BIT E) | DRIVE 0 (BIT F) | DRIVE 0 (BIT G) |
|---|---|---|---|---|---|---|---|
| ENCLOSURE 0 | 0 | 0 | 0 | 0 | 0 | 0 | 0 |
| ENCLOSURE 1 | 0 | 0 | 0 | 1 | 1 | 1 | 1 |
| ENCLOSURE 2 | 0 | 0 | 1 | 1 | 1 | 1 | 0 |
| ENCLOSURE 3 | 0 | 1 | 0 | 1 | 1 | 0 | 1 |
| ENCLOSURE 4 | 0 | 1 | 1 | 1 | 1 | 0 | 0 |
| ENCLOSURE 5 | 1 | 0 | 0 | 1 | 0 | 1 | 1 |
| ENCLOSURE 6 | 1 | 0 | 1 | 1 | 0 | 1 | 0 |
| ENCLOSURE 7 | 1 | 1 | 0 | 1 | 0 | 0 | 1 |

| | DRIVE 1 (BIT A) | DRIVE 1 (BIT B) | DRIVE 1 (BIT C) | DRIVE 1 (BIT D) | DRIVE 1 (BIT E) | DRIVE 1 (BIT F) | DRIVE 1 (BIT G) |
|---|---|---|---|---|---|---|---|
| ENCLOSURE 0 | 0 | 0 | 0 | 0 | 0 | 0 | 1 |
| ENCLOSURE 1 | 0 | 0 | 1 | 0 | 0 | 0 | 0 |
| ENCLOSURE 2 | 0 | 0 | 1 | 1 | 1 | 1 | 1 |
| ENCLOSURE 3 | 0 | 1 | 0 | 1 | 1 | 1 | 0 |
| ENCLOSURE 4 | 0 | 1 | 1 | 1 | 1 | 0 | 1 |
| ENCLOSURE 5 | 1 | 0 | 0 | 1 | 1 | 0 | 0 |
| ENCLOSURE 6 | 1 | 0 | 1 | 1 | 0 | 1 | 1 |
| ENCLOSURE 7 | 1 | 1 | 0 | 1 | 0 | 1 | 0 |

| | DRIVE 4 (BIT A) | DRIVE 4 (BIT B) | DRIVE 4 (BIT C) | DRIVE 4 (BIT D) | DRIVE 4 (BIT E) | DRIVE 4 (BIT F) | DRIVE 4 (BIT G) |
|---|---|---|---|---|---|---|---|
| ENCLOSURE 0 | 0 | 0 | 0 | 0 | 1 | 0 | 0 |
| ENCLOSURE 1 | 0 | 0 | 1 | 0 | 0 | 1 | 1 |
| ENCLOSURE 2 | 0 | 1 | 0 | 0 | 0 | 1 | 0 |
| ENCLOSURE 3 | 0 | 1 | 1 | 0 | 0 | 0 | 1 |
| ENCLOSURE 4 | 1 | 0 | 0 | 0 | 0 | 0 | 0 |
| ENCLOSURE 5 | 1 | 0 | 0 | 1 | 1 | 1 | 1 |
| ENCLOSURE 6 | 1 | 0 | 1 | 1 | 1 | 1 | 0 |
| ENCLOSURE 7 | 1 | 1 | 0 | 1 | 1 | 0 | 1 |

| | DRIVE 5 (BIT A) | DRIVE 5 (BIT B) | DRIVE 5 (BIT C) | DRIVE 5 (BIT D) | DRIVE 5 (BIT E) | DRIVE 5 (BIT F) | DRIVE 5 (BIT G) |
|---|---|---|---|---|---|---|---|
| ENCLOSURE 0 | 0 | 0 | 0 | 0 | 1 | 0 | 1 |
| ENCLOSURE 1 | 0 | 0 | 1 | 0 | 1 | 0 | 0 |
| ENCLOSURE 2 | 0 | 1 | 0 | 0 | 0 | 1 | 1 |
| ENCLOSURE 3 | 0 | 1 | 1 | 0 | 0 | 1 | 0 |
| ENCLOSURE 4 | 1 | 0 | 0 | 0 | 0 | 0 | 1 |
| ENCLOSURE 5 | 1 | 0 | 1 | 0 | 0 | 0 | 0 |
| ENCLOSURE 6 | 1 | 0 | 1 | 1 | 1 | 1 | 1 |
| ENCLOSURE 7 | 1 | 1 | 0 | 1 | 1 | 1 | 0 |

FIG. 9A

|  | DRIVE 6 (BIT A) | DRIVE 6 (BIT B) | DRIVE 6 (BIT C) | DRIVE 6 (BIT D) | DRIVE 6 (BIT E) | DRIVE 6 (BIT F) | DRIVE 6 (BIT G) |
|---|---|---|---|---|---|---|---|
| ENCLOSURE 0 | 0 | 0 | 0 | 0 | 1 | 1 | 0 |
| ENCLOSURE 1 | 0 | 0 | 1 | 0 | 1 | 0 | 1 |
| ENCLOSURE 2 | 0 | 1 | 0 | 0 | 1 | 0 | 0 |
| ENCLOSURE 3 | 0 | 1 | 1 | 0 | 0 | 1 | 1 |
| ENCLOSURE 4 | 1 | 0 | 0 | 0 | 0 | 1 | 0 |
| ENCLOSURE 5 | 1 | 0 | 1 | 0 | 0 | 0 | 1 |
| ENCLOSURE 6 | 1 | 1 | 0 | 0 | 0 | 0 | 0 |
| ENCLOSURE 7 | 1 | 1 | 0 | 1 | 1 | 1 | 1 |

|  | DRIVE 7 (BIT A) | DRIVE 7 (BIT B) | DRIVE 7 (BIT C) | DRIVE 7 (BIT D) | DRIVE 7 (BIT E) | DRIVE 7 (BIT F) | DRIVE 7 (BIT G) |
|---|---|---|---|---|---|---|---|
| ENCLOSURE 0 | 0 | 0 | 0 | 0 | 1 | 1 | 1 |
| ENCLOSURE 1 | 0 | 0 | 1 | 0 | 1 | 1 | 0 |
| ENCLOSURE 2 | 0 | 1 | 0 | 0 | 1 | 0 | 1 |
| ENCLOSURE 3 | 0 | 1 | 1 | 0 | 1 | 0 | 0 |
| ENCLOSURE 4 | 1 | 0 | 0 | 0 | 0 | 1 | 1 |
| ENCLOSURE 5 | 1 | 0 | 1 | 0 | 0 | 1 | 0 |
| ENCLOSURE 6 | 1 | 1 | 0 | 0 | 0 | 0 | 1 |
| ENCLOSURE 7 | 1 | 1 | 1 | 0 | 0 | 0 | 0 |

|  | DRIVE 8 (BIT A) | DRIVE 8 (BIT B) | DRIVE 8 (BIT C) | DRIVE 8 (BIT D) | DRIVE 8 (BIT E) | DRIVE 8 (BIT F) | DRIVE 8 (BIT G) |
|---|---|---|---|---|---|---|---|
| ENCLOSURE 0 | 0 | 0 | 0 | 1 | 0 | 0 | 0 |
| ENCLOSURE 1 | 0 | 0 | 1 | 0 | 1 | 1 | 1 |
| ENCLOSURE 2 | 0 | 1 | 0 | 0 | 1 | 1 | 0 |
| ENCLOSURE 3 | 0 | 1 | 1 | 0 | 1 | 0 | 1 |
| ENCLOSURE 4 | 1 | 0 | 0 | 0 | 1 | 0 | 0 |
| ENCLOSURE 5 | 1 | 0 | 1 | 0 | 0 | 1 | 1 |
| ENCLOSURE 6 | 1 | 1 | 0 | 0 | 0 | 1 | 0 |
| ENCLOSURE 7 | 1 | 1 | 1 | 0 | 0 | 0 | 1 |

FIG. 9B

CHART 2

BIT G = 1#3#5#7
BIT F1 = 1#2#5#6
BIT F2 = 2#3#6#7
BIT E1 = 1#2#3#4
BIT E2 = 2#3#4#5
BIT E3 = 0#1#2#7
BIT E4 = 0#1#2#3
BIT D1 = 1#2#3#4#5#6#7
BIT D2 = 2#3#4#5#6#7
BIT D3 = 5#6#7
BIT D4 = 6#7
BIT D5 = 7
BIT D6 = LOW
BIT C1 = 2#4#6
BIT C2 = 1#2#4#6
BIT C3 = 1#3#6
BIT C4 = 1#3#5#6
BIT C5 = 1#3#5
BIT C6 = 1#3#5#7 (= BIT G)
BIT B1 = 3#4#7
BIT B2 = 2#3#7
BIT B3 = 2#3#6#7
BIT A1 = 5#6#7
BIT A2 = 4#5#6#7

CHART 3

|          | A      | B      | C      | D       | E       | F       | G      |
|----------|--------|--------|--------|---------|---------|---------|--------|
| DRIVE 0  | BIT A1 | BIT B1 | BIT C1 | BIT D1  | BIT E1  | BIT F1  | BIT G  |
| DRIVE 1  | BIT A1 | BIT B1 | BIT C2 | BIT D2  | BIT E2  | BIT F2  | !BIT G |
| DRIVE 4  | BIT A2 | BIT B2 | BIT C3 | BIT D3  | !BIT E1 | BIT F1  | BIT G  |
| DRIVE 5  | BIT A2 | BIT B2 | BIT C4 | BIT D4  | !BIT E2 | BIT F2  | !BIT G |
| DRIVE 6  | BIT A2 | BIT B3 | BIT C5 | BIT D5  | BIT E3  | !BIT F1 | BIT G  |
| DRIVE 7  | BIT A2 | BIT B3 | BIT C6 | BIT D6  | BIT E4  | !BIT F2 | !BIT G |
| DRIVE 8  | BIT A2 | BIT B3 | BIT C6 | !BIT D1 | BIT E1  | BIT F1  | BIT G  |

FIG. 9C

CHART 4

| | DRIVE 2 (BIT A) | DRIVE 2 (BIT B) | DRIVE 2 (BIT C) | DRIVE 2 (BIT D) | DRIVE 2 (BIT E) | DRIVE 2 (BIT F) | DRIVE 2 (BIT G) |
|---|---|---|---|---|---|---|---|
| ENCLOSURE 0 | 0 | 0 | 0 | 0 | 0 | 1 | 0 |
| ENCLOSURE 1 | 0 | 0 | 1 | 0 | 0 | 0 | 1 |
| ENCLOSURE 2 | 0 | 1 | 0 | 0 | 0 | 0 | 0 |
| ENCLOSURE 3 | 0 | 1 | 0 | 1 | 1 | 1 | 1 |
| ENCLOSURE 4 | 0 | 1 | 1 | 1 | 1 | 1 | 0 |
| ENCLOSURE 5 | 1 | 0 | 0 | 1 | 1 | 0 | 1 |
| ENCLOSURE 6 | 1 | 0 | 1 | 1 | 1 | 0 | 0 |
| ENCLOSURE 7 | 1 | 1 | 0 | 1 | 0 | 1 | 1 |

| | DRIVE 3 (BIT A) | DRIVE 3 (BIT B) | DRIVE 3 (BIT C) | DRIVE 3 (BIT D) | DRIVE 3 (BIT E) | DRIVE 3 (BIT F) | DRIVE 3 (BIT G) |
|---|---|---|---|---|---|---|---|
| ENCLOSURE 0 | 0 | 0 | 0 | 0 | 0 | 1 | 1 |
| ENCLOSURE 1 | 0 | 0 | 1 | 0 | 0 | 1 | 0 |
| ENCLOSURE 2 | 0 | 1 | 0 | 0 | 0 | 0 | 1 |
| ENCLOSURE 3 | 0 | 1 | 1 | 0 | 0 | 0 | 0 |
| ENCLOSURE 4 | 0 | 1 | 1 | 1 | 1 | 1 | 1 |
| ENCLOSURE 5 | 1 | 0 | 0 | 1 | 1 | 1 | 0 |
| ENCLOSURE 6 | 1 | 0 | 1 | 1 | 1 | 0 | 1 |
| ENCLOSURE 7 | 1 | 1 | 0 | 1 | 1 | 0 | 0 |

| | DRIVE 9 (BIT A) | DRIVE 9 (BIT B) | DRIVE 9 (BIT C) | DRIVE 9 (BIT D) | DRIVE 9 (BIT E) | DRIVE 9 (BIT F) | DRIVE 9 (BIT G) |
|---|---|---|---|---|---|---|---|
| ENCLOSURE 0 | 0 | 0 | 0 | 1 | 0 | 0 | 1 |
| ENCLOSURE 1 | 0 | 0 | 1 | 1 | 0 | 0 | 0 |
| ENCLOSURE 2 | 0 | 1 | 0 | 0 | 1 | 1 | 1 |
| ENCLOSURE 3 | 0 | 1 | 1 | 0 | 1 | 1 | 0 |
| ENCLOSURE 4 | 1 | 0 | 0 | 0 | 1 | 0 | 1 |
| ENCLOSURE 5 | 1 | 0 | 1 | 0 | 1 | 0 | 0 |
| ENCLOSURE 6 | 1 | 1 | 0 | 0 | 0 | 1 | 1 |
| ENCLOSURE 7 | 1 | 1 | 1 | 0 | 0 | 1 | 0 |

| | DRIVE 10 (BIT A) | DRIVE 10 (BIT B) | DRIVE 10 (BIT C) | DRIVE 10 (BIT D) | DRIVE 10 (BIT E) | DRIVE 10 (BIT F) | DRIVE 10 (BIT G) |
|---|---|---|---|---|---|---|---|
| ENCLOSURE 0 | 0 | 0 | 0 | 1 | 0 | 1 | 0 |
| ENCLOSURE 1 | 0 | 0 | 1 | 1 | 0 | 0 | 1 |
| ENCLOSURE 2 | 0 | 1 | 0 | 1 | 0 | 0 | 0 |
| ENCLOSURE 3 | 0 | 1 | 1 | 0 | 1 | 1 | 1 |
| ENCLOSURE 4 | 1 | 0 | 0 | 0 | 1 | 1 | 0 |
| ENCLOSURE 5 | 1 | 0 | 1 | 0 | 1 | 0 | 1 |
| ENCLOSURE 6 | 1 | 1 | 0 | 0 | 1 | 0 | 0 |
| ENCLOSURE 7 | 1 | 1 | 1 | 0 | 0 | 1 | 1 |

FIG. 14A

|  | DRIVE 11 (BIT A) | DRIVE 11 (BIT B) | DRIVE 11 (BIT C) | DRIVE 11 (BIT D) | DRIVE 11 (BIT E) | DRIVE 11 (BIT F) | DRIVE 11 (BIT G) |
|---|---|---|---|---|---|---|---|
| ENCLOSURE 0 | 0 | 0 | 0 | 1 | 0 | 1 | 1 |
| ENCLOSURE 1 | 0 | 0 | 1 | 1 | 0 | 1 | 0 |
| ENCLOSURE 2 | 0 | 1 | 0 | 1 | 0 | 0 | 1 |
| ENCLOSURE 3 | 0 | 1 | 1 | 1 | 0 | 0 | 0 |
| ENCLOSURE 4 | 1 | 0 | 0 | 0 | 1 | 1 | 1 |
| ENCLOSURE 5 | 1 | 0 | 1 | 0 | 1 | 1 | 0 |
| ENCLOSURE 6 | 1 | 1 | 0 | 0 | 1 | 0 | 1 |
| ENCLOSURE 7 | 1 | 1 | 1 | 0 | 1 | 0 | 0 |

|  | DRIVE 12 (BIT A) | DRIVE 12 (BIT B) | DRIVE 12 (BIT C) | DRIVE 12 (BIT D) | DRIVE 12 (BIT E) | DRIVE 12 (BIT F) | DRIVE 12 (BIT G) |
|---|---|---|---|---|---|---|---|
| ENCLOSURE 0 | 0 | 0 | 0 | 1 | 1 | 0 | 0 |
| ENCLOSURE 1 | 0 | 0 | 1 | 1 | 0 | 1 | 1 |
| ENCLOSURE 2 | 0 | 1 | 0 | 1 | 0 | 1 | 0 |
| ENCLOSURE 3 | 0 | 1 | 1 | 1 | 0 | 0 | 1 |
| ENCLOSURE 4 | 1 | 0 | 0 | 1 | 0 | 0 | 0 |
| ENCLOSURE 5 | 1 | 0 | 1 | 0 | 1 | 1 | 1 |
| ENCLOSURE 6 | 1 | 1 | 0 | 0 | 1 | 1 | 0 |
| ENCLOSURE 7 | 1 | 1 | 1 | 0 | 1 | 0 | 1 |

|  | DRIVE 13 (BIT A) | DRIVE 13 (BIT B) | DRIVE 13 (BIT C) | DRIVE 13 (BIT D) | DRIVE 13 (BIT E) | DRIVE 13 (BIT F) | DRIVE 13 (BIT G) |
|---|---|---|---|---|---|---|---|
| ENCLOSURE 0 | 0 | 0 | 0 | 1 | 1 | 0 | 1 |
| ENCLOSURE 1 | 0 | 0 | 1 | 1 | 1 | 0 | 0 |
| ENCLOSURE 2 | 0 | 1 | 0 | 1 | 0 | 1 | 1 |
| ENCLOSURE 3 | 0 | 1 | 1 | 1 | 0 | 1 | 0 |
| ENCLOSURE 4 | 1 | 0 | 0 | 1 | 0 | 0 | 1 |
| ENCLOSURE 5 | 1 | 0 | 1 | 1 | 0 | 0 | 0 |
| ENCLOSURE 6 | 1 | 1 | 0 | 0 | 1 | 1 | 1 |
| ENCLOSURE 7 | 1 | 1 | 1 | 0 | 1 | 1 | 0 |

|  | DRIVE 14 (BIT A) | DRIVE 14 (BIT B) | DRIVE 14 (BIT C) | DRIVE 14 (BIT D) | DRIVE 14 (BIT E) | DRIVE 14 (BIT F) | DRIVE 14 (BIT G) |
|---|---|---|---|---|---|---|---|
| ENCLOSURE 0 | 0 | 0 | 0 | 1 | 1 | 1 | 0 |
| ENCLOSURE 1 | 0 | 0 | 1 | 1 | 1 | 0 | 1 |
| ENCLOSURE 2 | 0 | 1 | 0 | 1 | 1 | 0 | 0 |
| ENCLOSURE 3 | 0 | 1 | 1 | 1 | 0 | 1 | 1 |
| ENCLOSURE 4 | 1 | 0 | 0 | 1 | 0 | 1 | 0 |
| ENCLOSURE 5 | 1 | 0 | 1 | 1 | 0 | 0 | 1 |
| ENCLOSURE 6 | 1 | 1 | 0 | 1 | 0 | 0 | 0 |
| ENCLOSURE 7 | 1 | 1 | 1 | 0 | 1 | 1 | 1 |

FIG. 14B

CHART 5

BIT G = 1#3#5#7
BIT F1 = 0#3#4#7
BIT F2 = 0#1#4#5
BIT E1 = 3#4#5#6
BIT E2 = 4#5#6#7
BIT E3 = 2#3#4#5
BIT E4 = 0#5#6#7
BIT D1 = 3#4#5#6#7
BIT D2 = 4#5#6#7      (=E2)
BIT D3 = 0#1
BIT D4 = 1#2#3#4
BIT D5 = 0#1#2#3#4#5
BIT D6 = 0#1#2#3#4#5#6
BIT C1 = 1#4#6
BIT C2 = 1#3#4#6
BIT C3 = 1#3#5#7       (=G)
BIT B1 = 2#3#4#7
BIT B2 = 2#3#6#7
BIT A1 = 5#6#7
BIT A2 = 4#5#6#7

CHART 6

|  | A | B | C | D | E | F | G |
|---|---|---|---|---|---|---|---|
| DRIVE 2 | A1 | B1 | C1 | D1 | E1 | F1 | G |
| DRIVE 3 | A1 | B1 | C2 | D2 | E2 | F2 | !G |
| DRIVE 9 | A2 | B2 | C3 | D3 | E3 | !F2 | !G |
| DRIVE 10 | A2 | B2 | C3 | !D1 | E1 | F1 | G |
| DRIVE 11 | A2 | B2 | C3 | !D2 | E2 | F2 | !G |
| DRIVE 12 | A2 | B2 | C3 | D4 | E4 | !F1 | G |
| DRIVE 13 | A2 | B2 | C3 | D5 | !E3 | !F2 | !G |
| DRIVE 14 | A2 | B2 | C3 | D6 | !E1 | F1 | G |

FIG. 14C

ATTAINING HIGH AVAILABILITY THROUGH A POWER SYSTEM BRANCH ARCHITECTURE

FIELD OF THE INVENTION

The present invention relates generally to highly available systems, and more particularly to a power system and disk addressing architecture that contributes to high availability in a storage system.

BACKGROUND OF THE INVENTION

Modern storage systems are put to a variety of commercial uses. For example, they are coupled with host systems to store data for purposes of product development, and large storage systems are used by financial institutions to store critical data in large databases. For most uses to which such storage systems are put, it is very important that they be highly reliable so that critical data is not lost. "Highly available" storage systems are provided for this reason. High availability is provided, for example, by duplicating data across disks, and by making sure that cached data can be written back to disks in the event of a failure. Furthermore, reserved disk areas containing the storage system's operating system and other critical software may be "mirrored" between disks, so that if one disk fails, the mirrored copy of the reserved area can still be accessed. However, there are other vulnerable parts of storage systems that, in the event of a failure, can cause catastrophic results. For example, the power system is obviously extremely important to the reliability of the entire storage system. Some known storage systems provide separate power supplies for each disk so that, if a power supply fails, only one disk is lost. But, this is a very expensive and space consuming solution. Also, the manner in which individual disk drives in a storage system are addressed is important to the reliability of the system, since a fault in addressing would prevent access to data on one or more disks. It would be advantageous to provide a storage system in which only a few power supplies can power many disks in a highly reliable manner. It would be further desirable to provide a storage system in which disk addressing is highly reliable.

SUMMARY OF THE INVENTION

In accordance with the principles of the invention, a system includes a plurality of devices. Each device includes a reserved space, which may contain, for example, an operating system. A plurality of power branches provide power to the devices. At least one of the devices is coupled to a first of the power branches, and at least one other device is coupled to another of the power branches. High availability is thereby provided, because if one power branch fails, the device coupled to the other power branch is still available, and thus the reserved space is still accessible. The invention is advantageously implemented in a storage system, where reserved areas are located on different storage devices.

More particularly, the invention can be used in systems wherein multiple mirrored reserved spaces are used. For example, a first device, for example a storage device, includes a first reserved space. A second storage device includes a second reserved space. A third storage device includes a copy of the first reserved space. A fourth storage device includes a copy of the second reserved space. These reserved spaces may contain, for example, an operating system. A first power branch provides power to the first storage device and the second storage device. A second power branch provides power to the third storage device and the fourth storage device. So, if either power branch fails, either a reserved space or its corresponding copy will remain accessible.

Furthermore, a first plurality of storage devices are coupled to the first power branch, while a second plurality of storage devices are coupled to the second power branch. Each plurality of storage devices can be used as a vault LUN. Thus, if either power branch fails, a plurality of storage devices is available to be used as a vault LUN.

Another aspect of the invention provides highly available addressing of devices while also providing highly efficient production and routing of address signals. In accordance with this aspect of the invention, each of a plurality of devices has a unique address represented by a separate plurality of address bits. Logic produces intermediate bits, the number of intermediate bits being fewer than the number of address bits. The intermediate bits are used to drive the address bits. Some of the intermediate bits drive more than one address bit. As a result, signal routing is highly efficient because fewer signals need be routed across a printed circuit board.

Furthermore, the logic comprises a first logic device and a second logic device. The first logic device produces first intermediate bits, and the second logic device produces second intermediate bits. The first intermediate bits are used to drive a first set of the address bits. Some of the first intermediate bits drive more than one of the first set of address bits. The second logic device produces second intermediate bits which are used to drive a second set of the address bits. Some of the second intermediate bits are used to drive more than one of the second set of address bits. Advantageously, the first set of address bits is associated with a first set of the plurality of devices, and the second set of address bits is associated with a second set of the plurality of devices. So, if either the first logic device or the second logic device fails, address bits will still be available to one of the sets of devices. High availability is further enhanced by combining both aspects of the invention within a storage system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8 presents two charts showing disk drive addressing in decimal and hexadecimal notation.

FIG. 9 presents three charts showing how the intermediate address bits are derived for one set of disk drives.

FIG. 14 presents three charts showing how the intermediate address bits are derived for another set of disk drives.

DETAILED DESCRIPTION OF EXEMPLARY EMBODIMENTS

Figure 1:
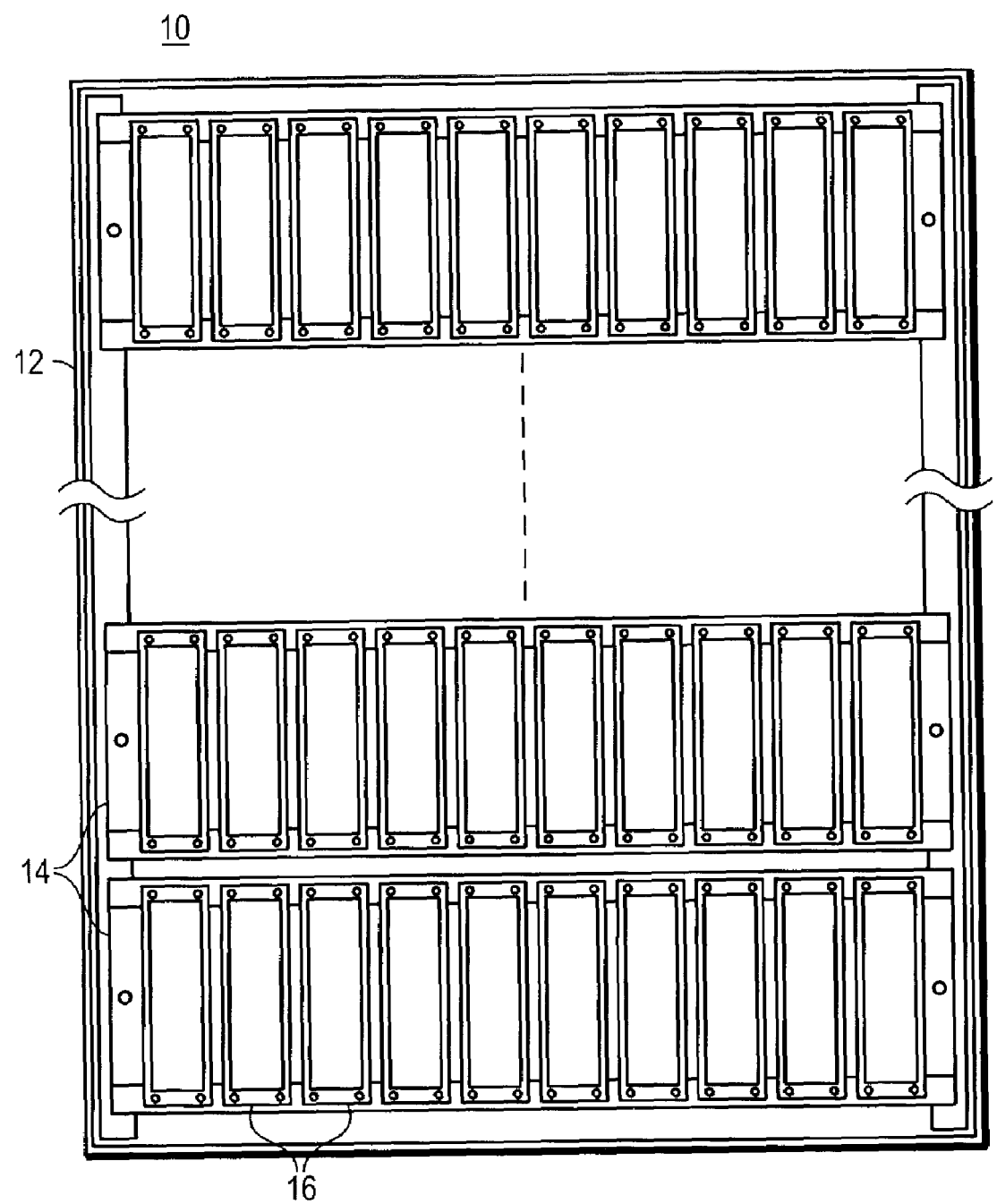
FIG. 1 is a representation of a rack mount system including several storage enclosures.
Figure 2:
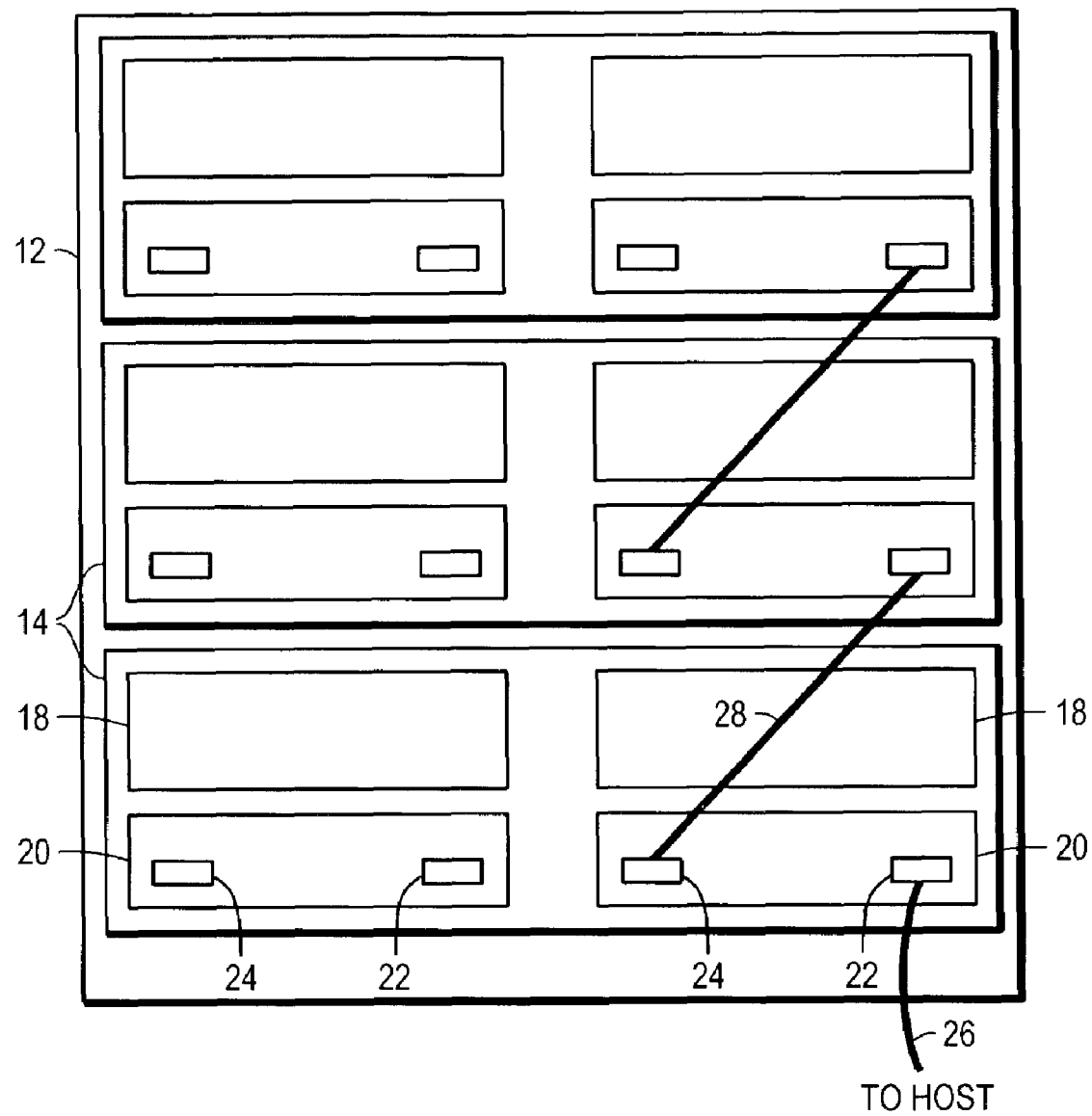
FIG. 2 is a rear view of the rack mount system and storage enclosures of FIG. 1.

Referring to FIG. 1, there is shown an example of a storage system 10 in which the present invention may be employed. A rack mount cabinet 12 includes several storage enclosures 14. Each storage enclosure 14 includes several disk drives 16. The disk drives and the enclosures are preferably interconnected via a serial bus loop or ring architecture, for example a Fibre Channel Arbitrated Loop (FC-AL). In FIG. 2 there is shown a rear view of the rack mount cabinet 12 and the storage enclosure 14. Each storage enclosure includes two power supplies 18, and two link control cards 20. The power supplies 18 and link control cards 20 are coupled to the disk drives 16 via a midplane within the chassis (not shown). The link control card 20 serves to interconnect the disks and enclosures on the FC-AL.

Each link control card 20 includes a primary port 22 and an expansion port 24. These ports are used to link the storage enclosures together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner to form the FC-AL. Thus, all the disk drives 16 are interconnected on the same FC-AL.

Figure 3:
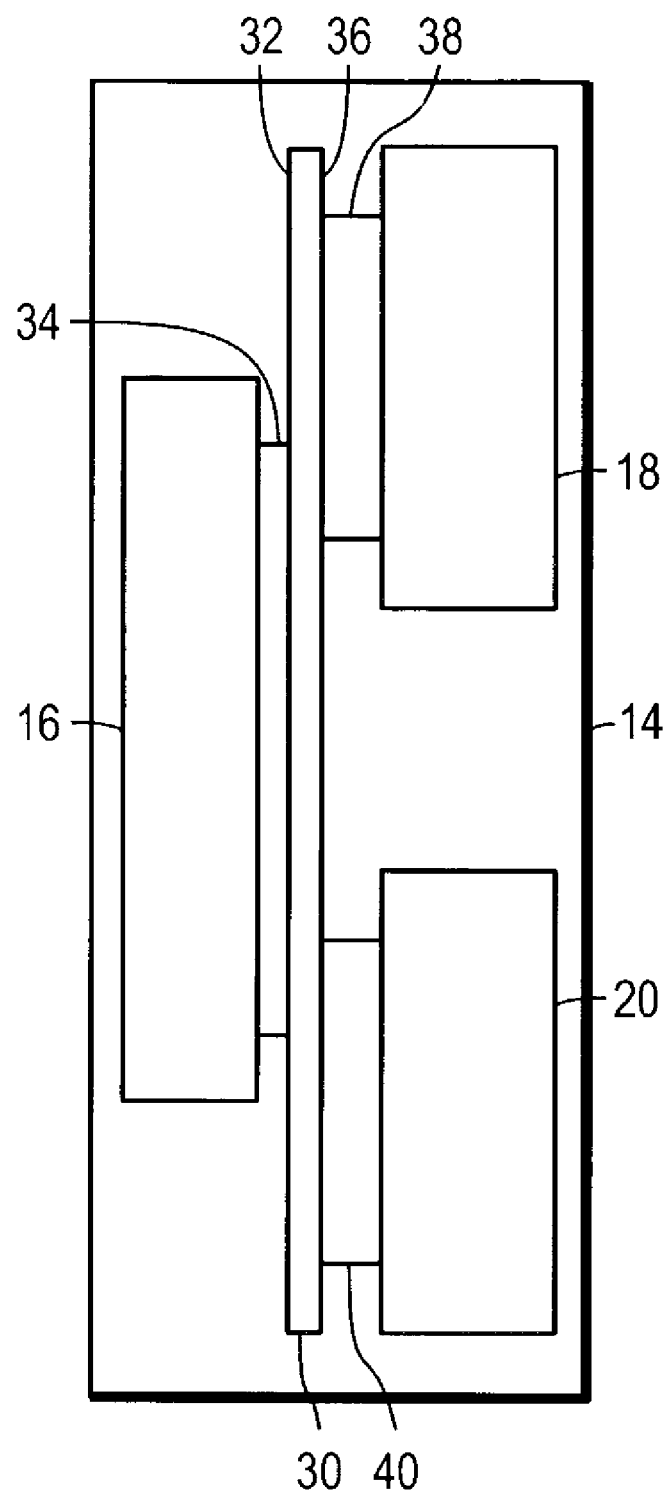
FIG. 3 is a side view of one of the storage enclosures, showing the midplane.

Referring to FIG. 3, there is shown a side view of the enclosure 14 wherein the midplane 30 is visible. The disk drives 16 are coupled to one side 32 of the midplane 30 via disk drive connectors 34. The power supplies 18 are coupled to the top of the opposite side 36 of the midplane 30 via power supply connectors 38, and the link control cards 20 are coupled to the bottom of the side 36 of the midplane 30 via LCC connectors 40. The midplane 30 routes all power, Fibre Channel, and other control signals between the link control cards 20, the power supplies 18, and the disk drives 16.

The inclusion of two link control cards 20 and two power supplies 18 provide a highly available system. Each link control card 20 is capable of controlling all the disks 16 in a given enclosure. Likewise, each power supply is capable of powering both link control cards 20 and all the disk drives 16 in a given enclosure.

Figure 4:
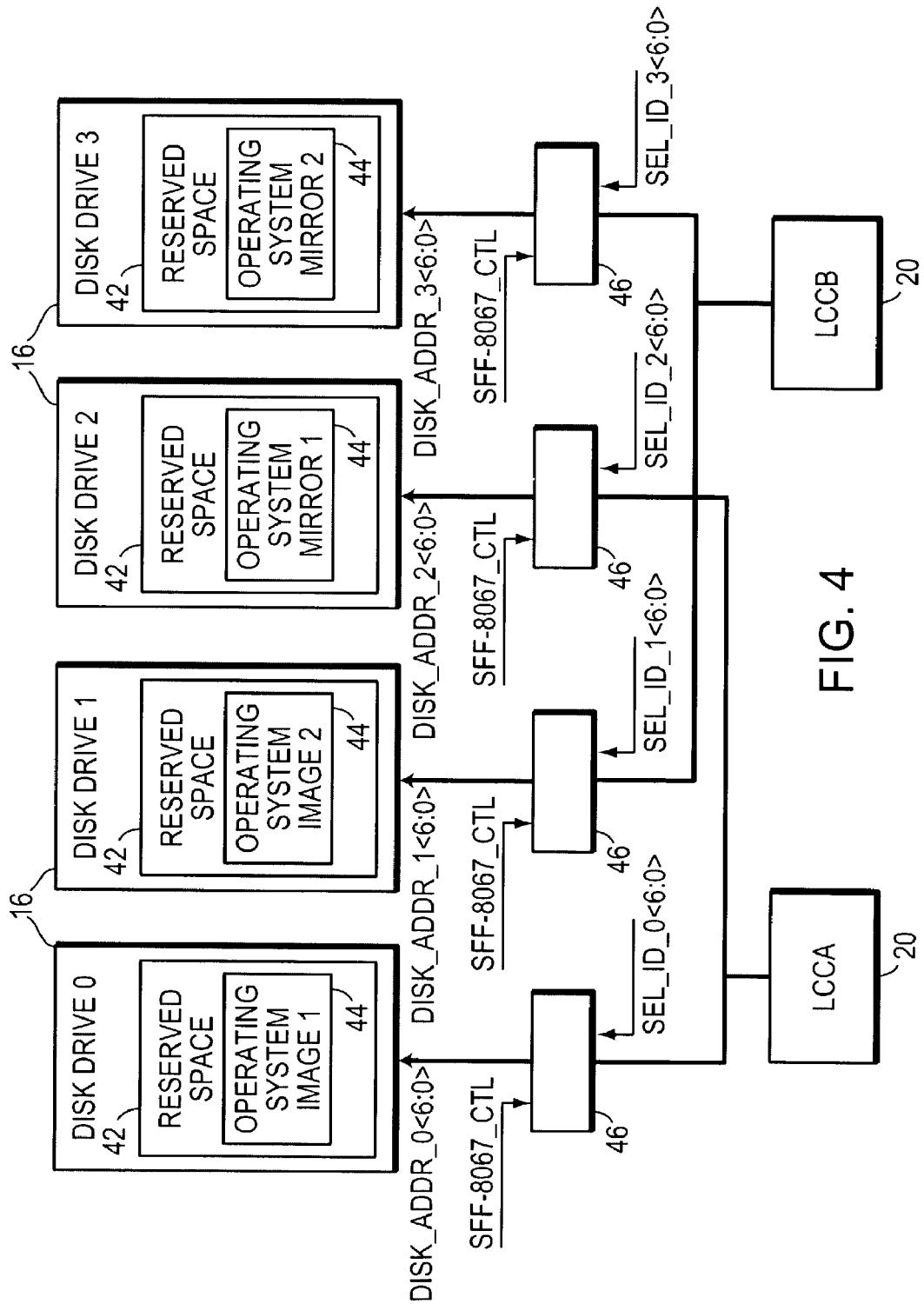
FIG. 4 is a schematic representation of the link control cards coupled to the disk drives.

The system provides further high availability through the way in which the link control cards 20 are interconnected to the disk drives 16. As previously described, each of the link control cards 20 has physical access to all of the disk drives 16. Thus, each link control card 20 can access user space on every disk drive 16. However, certain reserved spaces on the first four disk drives are divided for use between the link control cards 20. Referring to FIG. 4, there is shown the first four disk drives 16, herein labeled disk drives 0-3, as they are logically coupled to the link control cards 20, herein labeled LCCA and LCCB, for access to reserved spaces 42 on the drives 16. A section of storage space on each of these disk drives, reserved space 42, is reserved for system use by the link control cards 20, while the remainder of the storage space on the drives is available as user storage space and accessible to both link control cards 20. An operating system 44 resides within the reserved space 42. The operating system 44 may be for example Microsoft NT. It is important that the link control cards 20 always have access to the reserved space 42 containing the operating system 44, because if any interruption occurs, the system is vulnerable to failure. Therefore, each link control card 20 has access to an operating system 44 on one drive, and a mirror copy of the operating system 44 on another drive. Thus, if a link control card 20 loses access to the operating system 44 on one drive, it can access the mirror drive to continue operating. As herein shown, the link control card LCCA is coupled to disks 0 and 2. Disk 2 contains the mirror copy of the operating system on disk 0. The operating system on disk 0 is labeled "Operating System Image 1". The mirrored operating system on disk 2 is labeled "Operating System Mirror 1". The link control card LCCB is coupled to disks 1 and 3. Disk 3 contains the mirror copy of the operating system on disk 1. The operating system on disk 1 is labeled "Operating System Image 2". The mirrored operating system on disk 3 is labeled "Operating System Mirror 2".

Furthermore, the storage system supports an industry standard enclosure management protocol known as SFF-8067, described in detail in "SFF-8067 Specification for 40-pin SCA-s Connector w/Bidirectional ESI". This protocol is used primarily in JBOD ("just a bunch of disks") environments, for managing the storage system via the Fibre Channel connection. Each disk drive 0-3 is coupled to a 7 bit group of address lines, shown as Disk_Addr_0<6:0>, Disk_Addr_1<6:0>, Disk_Addr_2<6:0>, and Disk_Addr_3<6:0>, and referred to generally as a group as Disk_Addr_X<6:0>. The Disk_Addr_X<6:0> address lines are driven by gates 46 under control of the control signal SFF-8067_CTL. When SFF-8067 commands are being issued, the SFF-8067_CTL signal is asserted, and the link control cards LCCA and/or LCCB drive the Disk_Addr_X<6:0> lines for enclosure management purposes. When SFF-8067 commands are not being issued, the SFF-8067_CTL signal is deasserted, and the Disk_Addr_X<6:0> lines are driven by select lines, shown as SEL_ID_0<6:0>, SEL_ID_1<6:1>, SEL_ID_2<6:0>, and SEL_ID_3<6:0>. These select lines are used to provide disk drive addresses in accordance with the Fibre Channel Arbitrated Loop protocol as will be further described. Again, in order to provide a highly available management interface, two primary disk drives provide the SFF-8067 interface, each coupled to a different link control card. Two secondary drives provide a secondary SFF-8067 interface. Each secondary interface is coupled to the opposite link control card as its respective primary interface. As shown, the Disk_Addr_0<6:0> and Disk_Addr_2<6:0> address lines for disks 0 and 2 are coupled to the link control card LCCA, while the Disk_Addr_1<6:0> and Disk_Addr_3<6:0> select lines for disks 1 and 3 are coupled to the link control card LCCB. Thus, if for example LCCA loses access to disk drive 0, it can still operate the SFF-8067 protocol via the Disk_Addr_2<6:0> lines coupled to disk drive 2.

Figure 5:
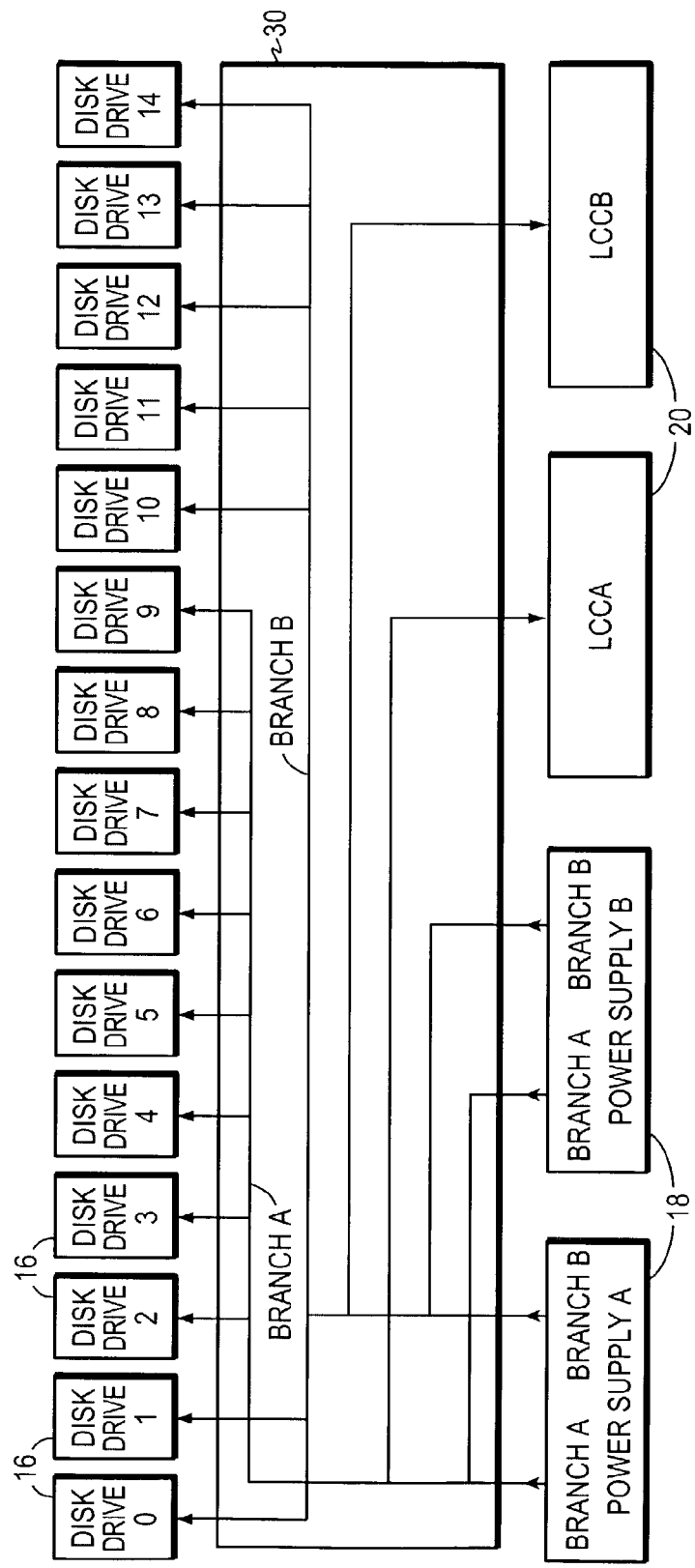
FIG. 5 is a schematic representation of the power supply branches coupled to the disk drives and link control cards.

In accordance with the invention, even more robust high availability is provided by the way in which the power system is routed between the link control cards 20 and the disk drives 16. Referring to FIG. 5, there is shown a representation of the manner in which power is routed on the midplane 30 to interconnect to the link control cards 20 and disk drives 16. Each power supply 18 provides +12 Volt power on each of two branches, shown as Branch A and Branch B. The link control card 20 labeled LCCA is coupled to Branch A. The link control card 20 labeled LCCB is coupled to Branch B. Fifteen disk drives 16 are shown, labeled disk drives 0-14. Disk drives 0 and 1, and 10-14, are coupled to Branch B. Disk drives 2-9 are coupled to Branch A. As a result, access by at least one link control card 20 to at least one copy of the operating system 44 is preserved in the event of the failure of either power supply Branch A or Branch B. For example, if a device on Branch A, such as disk drive 6, fails in such a manner as to short Branch A to ground, then the link control card LCCA will fail to function, and power will be lost to disks 2-9. However, the link control card LCCB, which is connected to Branch B, remains powered. Furthermore, though the mirror copy of the operating system software on the disk drive 3 is no longer available to the link control card LCCB, the primary copy on disk drive 1, connected to Branch B, remains available. The link control card LCCB can therefore continue to operate.

Access by at least one link control card to at least one disk for SFF-8067 operations is also preserved in the event of a failure of either power supply Branch A or Branch B. For example, if a device on Branch B, for example disk drive 11, fails in such a manner as to short Branch B to ground, then the link control card LCCB will fail to function, and power will be lost to disks 0, 1, and 10-14. However, the link control card LCCA, which is connected to Branch A, remains powered. Furthermore, though the select lines SEL_ID_0<6:0> cannot be accessed by the link control card LCCA for SFF-8067 operations, the SEL_ID_2<6:0> lines remain accessible for this purpose.

The routing of the power Branches is advantageous in other high availability architectures. The architecture so far described employs two images of an operating system on disks 0 and 1, each image being mirrored on disks 2 and 3 respectively. However, some storage architectures use a single copy of an operating system/driver/application with a triple mirror. For example, an operating system image might be stored on disk 0, and mirrored on disks 1 and 2. In this case, if Branch B were to fail, the operating system images on disks 0 and 1 would be inaccessible, but the image on disk 2, which is powered by Branch A, would remain accessible. On the other hand, if Branch A were to fail, the operating system image on disk 2 would be inaccessible, but the images on disks 0 and 1 would remain accessible.

Further high availability is obtained by coupling contiguous disks 4-8 to Branch A, and disks 10-14 to Branch B as shown. Highly available storage systems such as those described herein often employ caches for storing copies of the data stored on disk, so that host systems can access that data much more quickly. When a system failure occurs, the cached data must be copied back to disk so that no data is lost. Areas of contiguous drives are reserved for this purpose. Such areas are known as Vault Logical Units, or Vault LUNs. In the present system, a Vault LUN is an area reserved across five contiguous disks. Four disks are used for storage of data, while the fifth disk is used for storage of an error correction code such as parity or ECC. By coupling disks 4-8 to Branch A, and disks 10-14 to Branch B, then failure of either Branch will leave 5 remaining contiguous disks on the other Branch for implementation of the Vault LUN.

In accordance with another aspect of the invention, disk addressing is generated and routed on the midplane 30 in a manner that minimizes the number of signals that must be routed, while also providing further high availability. As was shown in FIGS. 1 and 2, several enclosures 14 are connected together to form a Fibre Channel Arbitrated Loop (FC-AL). In such an FC-AL, each disk drive 16 has a unique physical address, known as an arbitrated loop physical address (AL-PA). In the present example, each enclosure 14 contains 15 disk drives 16, and up to 8 enclosures 14 can be connected together to form an FC-AL. Thus, up to 120 disk drives 16 may be interconnected on the FC-AL, each requiring its own unique AL-PA.

Figure 6:
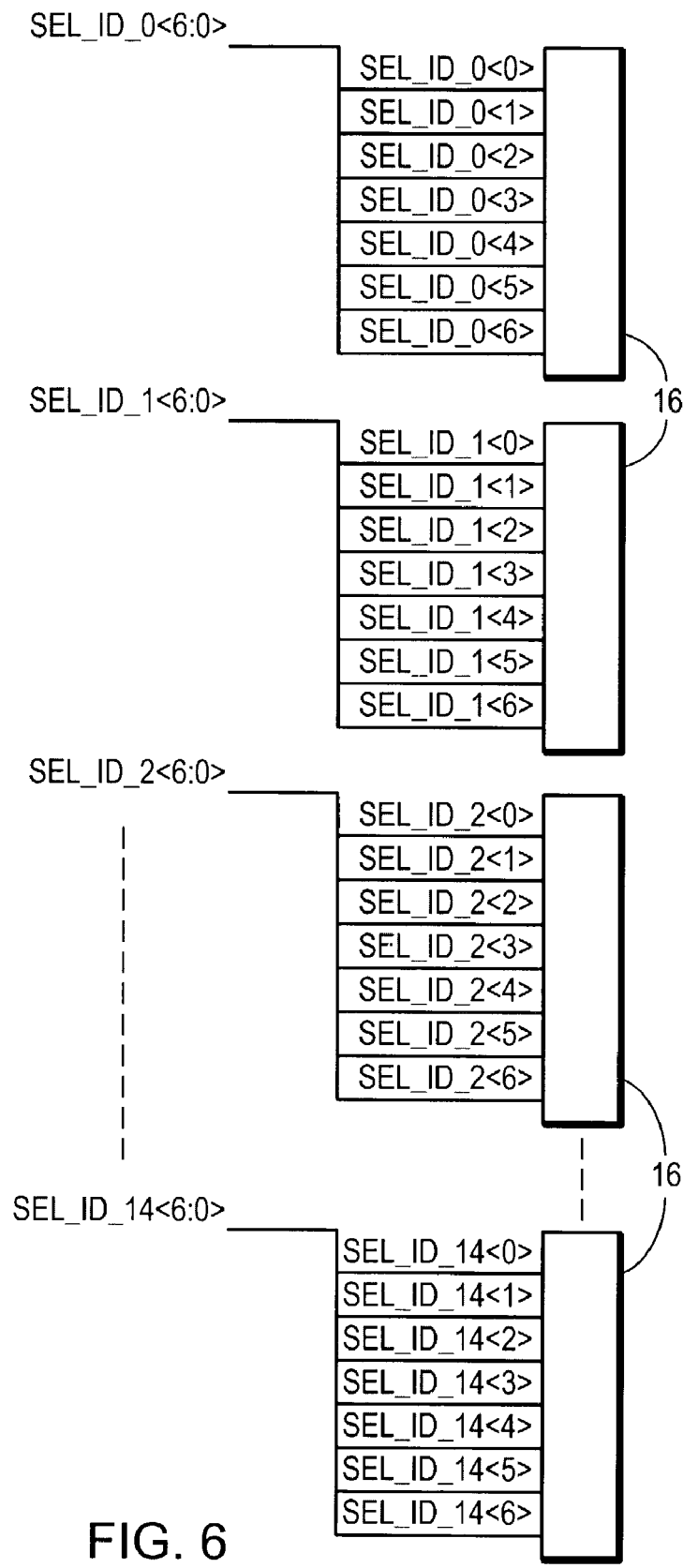
FIG. 6 is a schematic representation how the disk drives are addressed.
Figure 7:
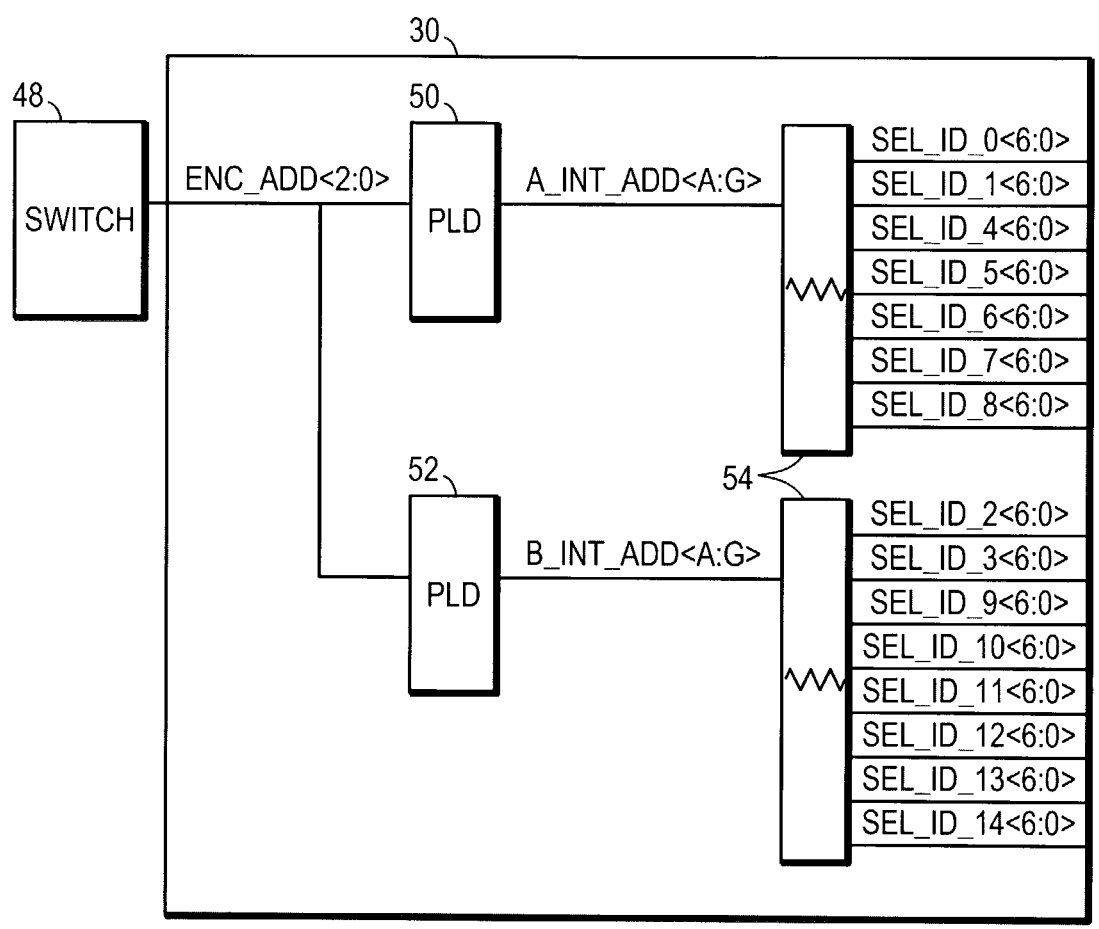
FIG. 7 is a schematic representation of the programmable logic devices and intermediate address bits that produce the disk drive address bits.

As shown in FIG. 6, each disk drive in an enclosure receives its AL-PA via a 7 bit group of select lines. For example, disk drive 0 receives its address via the bits SEL_ID_0<6:0>, disk drive 1 receives its address via the bits SEL_ID_1<6:0>, etc. These select lines will be further referred to as SEL_ID_X<6:0>, wherein X is 0-14, per disk drive. Referring to FIG. 7, each enclosure includes an enclosure address switch 48, which is used to set the enclosure address from 0 to 7. The enclosure address switch 48 encodes the enclosure address onto the 3-bit enclosure address bits ENC_ADD<2:0>. The ENC_ADD<2:0> bits are input to a pair of programmable logic devices (PLDs) 50 and 52, which produce intermediate address bits A_INT_ADD<A:G> and B_INT_ADD<A:G>, also referred to generally as a group as X_INT_ADD signals. The number of X_INT_ADD bits varies per PLD and design, as certain bits will be designated for example A1, A2, F1, F2, F3, etc. The X_INT_ADD signals are driven through series resistors 54 to produce the SEL_ID_X<6:0> disk address bits. A single X_INT_ADD signal may drive multiple SEL_ID_X bits. The PLDs may be for example ipsLSI 2032 devices from Lattice Semiconductor, or may be any of many similar available parts.

If the SEL_ID<6:0> bits were produced in the conventional manner, 7 bits per disk drive would have to be routed across each midplane 30, requiring a total routing of 105 signal lines per midplane 30. Routing such a large number of signal lines can be very difficult when space is limited, particularly if the midplane 30 includes cut-out holes for cooling. Therefore, in accordance with an aspect of the invention, the intermediate address bits X_INT_ADD<A:G> are produced in a manner that takes advantage of certain patterns that occur in the disk addressing, as will be further described. As a result, fewer than 105 X_INT_ADD bits are required to represent the disk drive addresses. As herein described, as few as 51 X_INT_ADD bits are required to represent the disk drive addresses. Thus, the X_INT_ADD bits are routed across the midplane 30, where they are then driven through series resistors 54 to produce the 105 SEL_ID_X<6:0> bits.

The provision of two PLDs 50 and 52 further enhances high availability. The A_INT_ADD<A:G> bits for disk drives 0, 1, and 4-8 are driven from the first PLD 50. The B_INT_ADD<6:0> bits for disk drives 2, 3, and 9-14 are driven from the second PLD 52. Thus, if either PLD should fail, half the disk drives 16 will still receive their SEL_ID_X<6:0> address bits. So, if PLD 50 fails, disk drives 0 and 1 cannot be addressed, but disk drive 2 can be addressed via PLD 52. The operating system 44 can therefore still be accessed by the link control card LCCA even in light of the failure of the PLD 50.

Note that, as discussed above, the vault LUN area is reserved across either disks 4-8 or 10-14, as opposed to, for example, disks 5-9. The division of disk addressing between the PLDs further enhances the reliability of the vault LUN areas, since the addresses for disks 4-8 are driven by PLD 50, while the addresses for disks 10-14 are driven by the PLD 52.

Furthermore, the $X_{INT}$_ADD signals are driven onto the SEL_ID_X<6:0> lines via series resistors 54, providing further high availability on the individual address lines. For example, if two SEL_ID_X bits are driven from the same X_INT_ADD bit, and one of those two SEL_ID_X bits shorts to ground for some reason, the series resistor 54 will isolate the shorted SEL_ID_X bit from the X_INT_ADD bit so that the X_INT_ADD bit can still drive the other, functioning SEL_ID_X bit.

The PLDs 50 and 52 that produce the X_INT_ADD bits operate as follows. First of all, referring to FIG. 8, the disk drive address map is shown, in decimal and in hex. As seen, the disk drive addresses range from 0-14 in enclosure 0, up to 105-119 in enclosure 7. Now, referring to FIG. 9, there is shown the manner in which the logic for the PLD 50 is derived. Shown in Chart 1 is the binary address for each of disk drives 0, 1, and 4-8 for each enclosure, labeled A-G from most significant to least significant bit. In other words, shown are the values that need to appear on the SEL_ID_X<6:0> bits for each of these drives in each of the enclosures. For example, the address of disk drive 0 in enclosure 0 is 0, as can be seen in the first line. The address for disk drive 0 in enclosure 1 is 15 decimal, or 'F' hex, as can be seen in line 2, and so on. As can be seen, certain patterns tend to repeat for each column of bits (in other words, for multiple drives) as addresses between enclosures change. For example, bit G varies in the same manner for disk drives 0, 4, 6, and 8. Bit G also varies in the same manner for disk drives 1, 5, and 7, and in a manner inverse to that for the other drives. As another example, bit 'F' varies in the same manner for disk drives 1, and 5. Bit 'F' also varies in another manner for disk drives 0, 4, and 8. Note that bit 'F' for disk 6 varies in a manner inverse to that for disks 0, 4, and 8. Recognition of these patterns associated with each bit driven to each drive allows consolidation of addressing, such that X_INT_ADD bits are produced that will map to multiple SEL_ID_X bits.

In FIG. 9, Chart 2, equations are produced based on the patterns for each column A-G. The equations reflect the different positions of binary '1's in each column. Each separate pattern of binary '1's that exists for each bit A-G is given a separate equation. The '#' symbol represents a logical 'OR' function. The '!' symbol represents a logical negation. For example, examination of bit G results in only one equation: G=1#3#5#7. As can be seen, the value of G is binary '1' for enclosures 1, 3, 5, and 7 regardless of disk drive slot. Otherwise, the value of G is binary '0'. So, this bit position can be represented for all drives as either G or !G. For bit F, there are two different repeating patterns, resulting in two equations, labeled F1 and F2. The first pattern is F1=1#2#5#6, which repeats for drives 0, 4, and 8. The second pattern is F2=2#3#6#7, which repeats for drives 1 and 5. Note that the pattern for disk drive 6 is the negation of F1 and can be represented as !F1. Likewise, the pattern for disk drive 7 is the negation of F2 and can be represented as !F2. For bit E, there are four different repeating patterns. One pattern repeats for disk drives 0 and 8, and its negation occurs for disk drive 4. Another pattern occurs for disk drive 1, and its negation occurs for disk drive 5. Disk drives 6 and 7 contain unique patterns and result in their own equations. The remaining bits D-A are treated in the same manner, resulting in the equations listed in chart 2. Note that equation D6='low' because bit D is always binary '0'. Once these equations have been drafted, further patterns can be identified. For example, the equation for C6 is the same as that for G.

Figure 10:
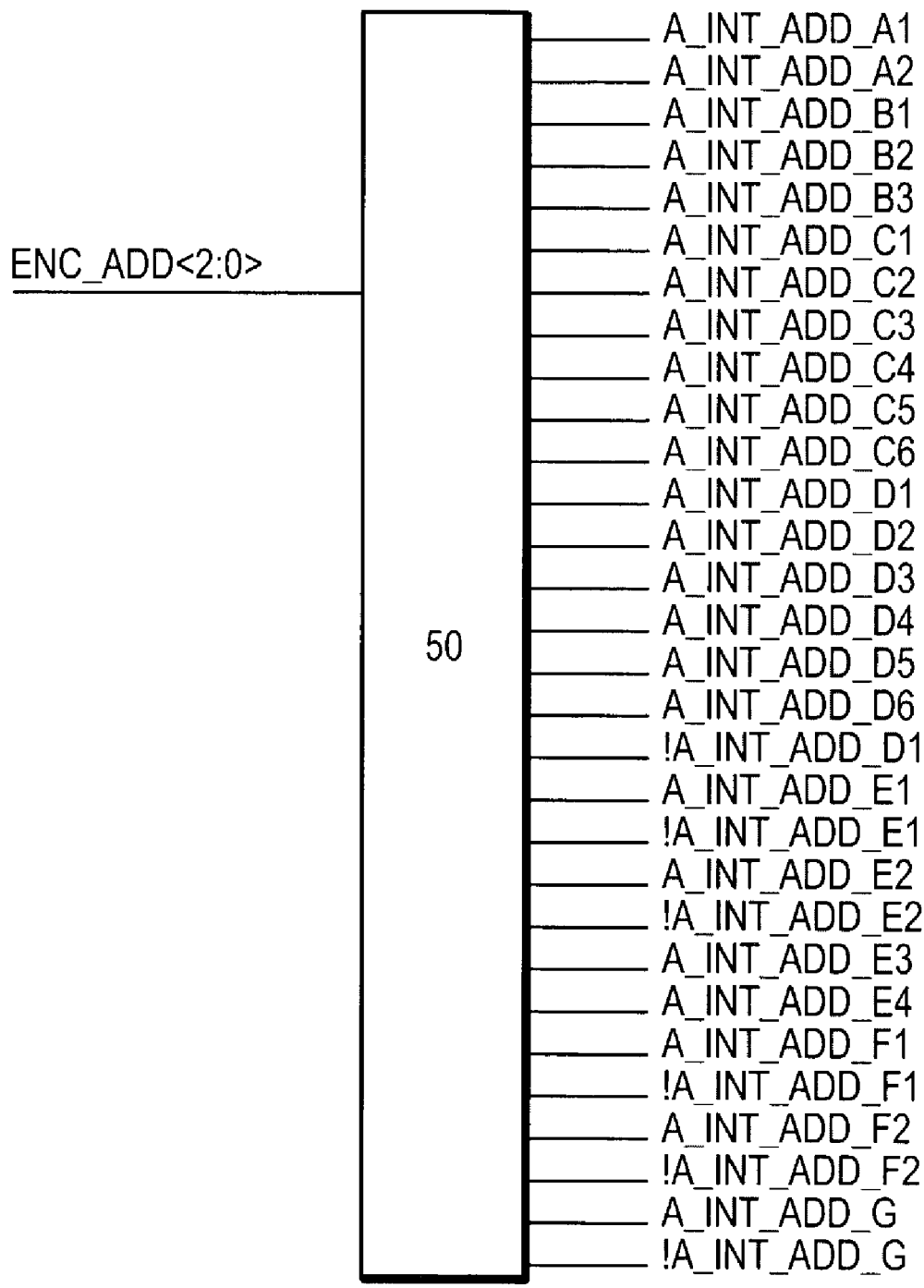
FIG. 10 is a schematic representation of a logic device producing intermediate address outputs.
Figure 11:
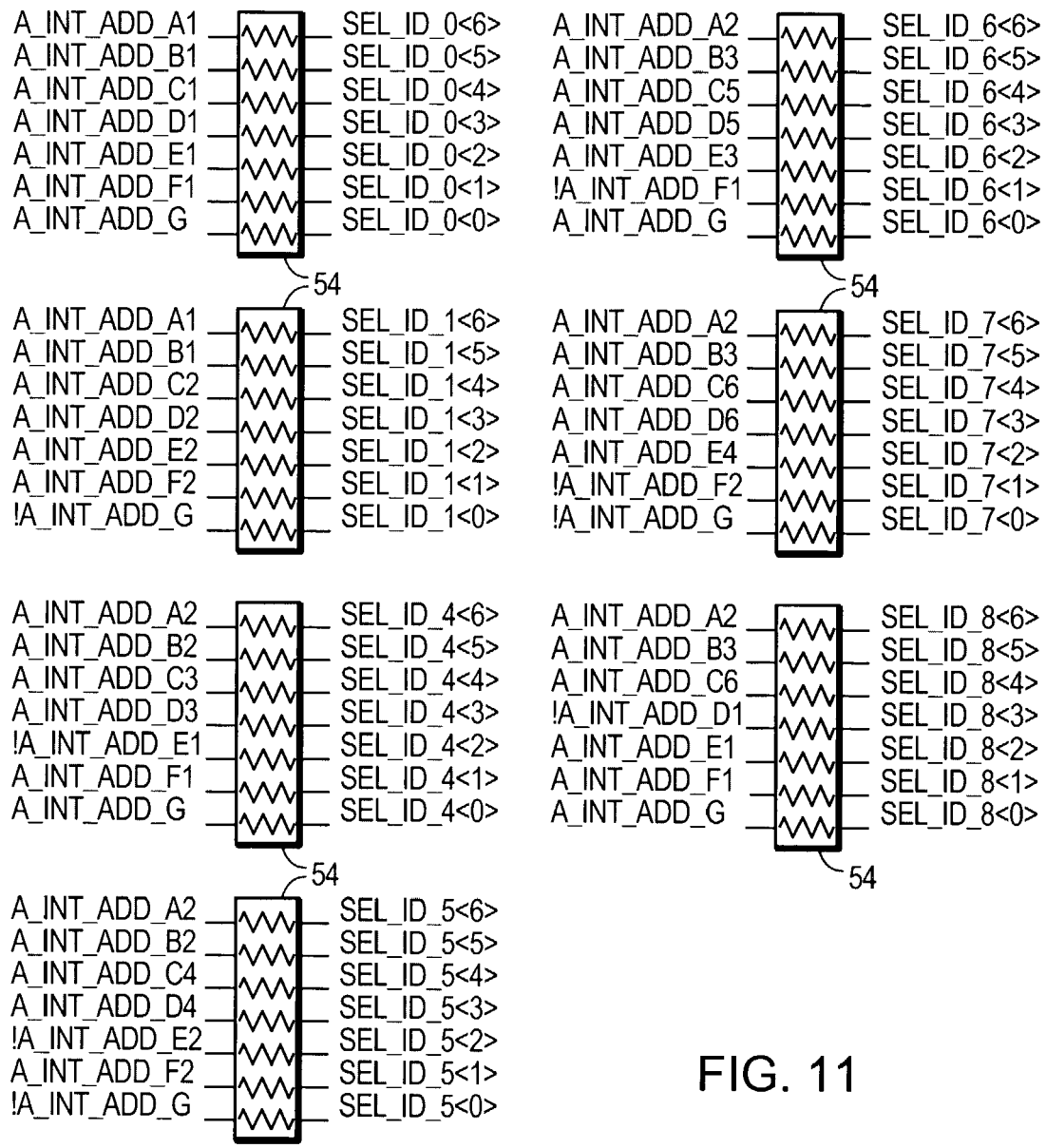
FIG. 11 is a schematic representation showing how the intermediate address bits of FIG. 10 drive the disk drive address bits.

Now, referring to FIG. 9 Chart 3, bits A-G for each disk drive 0, 1, and 4-8 can be represented by the equation that reflects the pattern for enclosures 0-7. For example, for disk drive 0, the G bit is represented by equation G. The F bit is represented by equation F1. The E bit is represented by equation E1, and so on. For disk drive 1, the G bit is represented by the negation of equation G, shown as !G. The F bit is represented by equation F2. The E bit is represented by equation E2, and so on. Chart 3 is completed in this manner for all disk drives 0, 1, and 4-8. Referring to FIG. 10, the PLD 50 is programmed to execute the equations of chart 2, and to produce the outputs required by the chart 3. The outputs are labeled A_INT_ADD_X wherein X is one of the outputs designated in chart 3. So, the outputs of the PLD 50 are A_INT_ADD_G, !A_INT_ADD_G, A_INT_ADD_F1, !A_INT_ADD_F1, A_INT_ADD_F2, !A_INT_ADD_F2, A_INT_ADD_E1, !A_INT_ADD_E1, A_INT_ADD_E2, A_INT_ADD_E3, A_INT_ADD_E4, A_INT_ADD_D1, !A_INT_ADD_D1, A_INT_ADD_D2, A_INT_ADD_D3, A_INT_ADD_D4, A_INT_ADD_D5, A_INT_ADD_D6, A_INT_ADD_C1, A_INT_ADD_C2, A_INT_ADD_C3, A_INT_ADD_C4, A_INT_ADD_C5, A_INT_ADD_C6, A_INT_ADD_B1, A_INT_ADD_B2, A_INT_ADD_B3, A_INT_ADD_A1, and A_INT_ADD_A2. So, the 49 SEL_ID_X<6:0> bits that would be required for disk drives 0, 1, and 4-8 are represented by 29 A_INT_ADD bits. As can be seen in FIG. 11, the A_INT_ADD signals are driven from the PLD 50 through series resistors 54 to drive the corresponding SEL_ID_X bits. For example, A_INT_ADD_G drives SEL_ID 0<0>, SEL_ID_4<0>, SEL_ID_6<0>, and SEL_ID_8<0>. !A_INT_ADD_G drives SEL_ID_1<0>, SEL_ID_3<0>, SEL_ID_5<0>, and SEL_ID_7<0>. A_INT_ADD_F1 drives SEL_ID0<1>, SEL_ID_4<1>, and SEL_ID_8<1>. !A_INT_ADD_F1 drives SEL_ID_6<1>. A_INT_ADD_F2 drives SEL_ID_1<1> and SEL_ID_5<1>. !A_INT_ADD_F2 drives SEL_ID_7<1>. The remaining SEL_ID_X bits are driven as shown in FIG. 11, as determined by the chart 3.

As was shown, further consolidation can be had where equations match. For instance, instead of producing the output A_INT_ADD_C6, SEL_ID_7<4> and SEL_ID_8<4> could be driven by A_INT_ADD_G. As previously described, the series resistors 54 have been provided to isolate the various SEL_ID_X bits that are coupled to the same X_INT_ADD bit. For instance, SEL_ID_0<0>, SEL_ID_4<0>, SEL_ID_6<0>, and SEL_ID_8<0> are all driven by A_INT_ADD_G. If any of these SEL_ID_X bits should suffer a fault, such as a short to ground or each other, the series resistors isolate the A_INT_ADD_G bit from the fault so that the other functional SEL_ID_X bits can still be properly driven.

Figure 12:
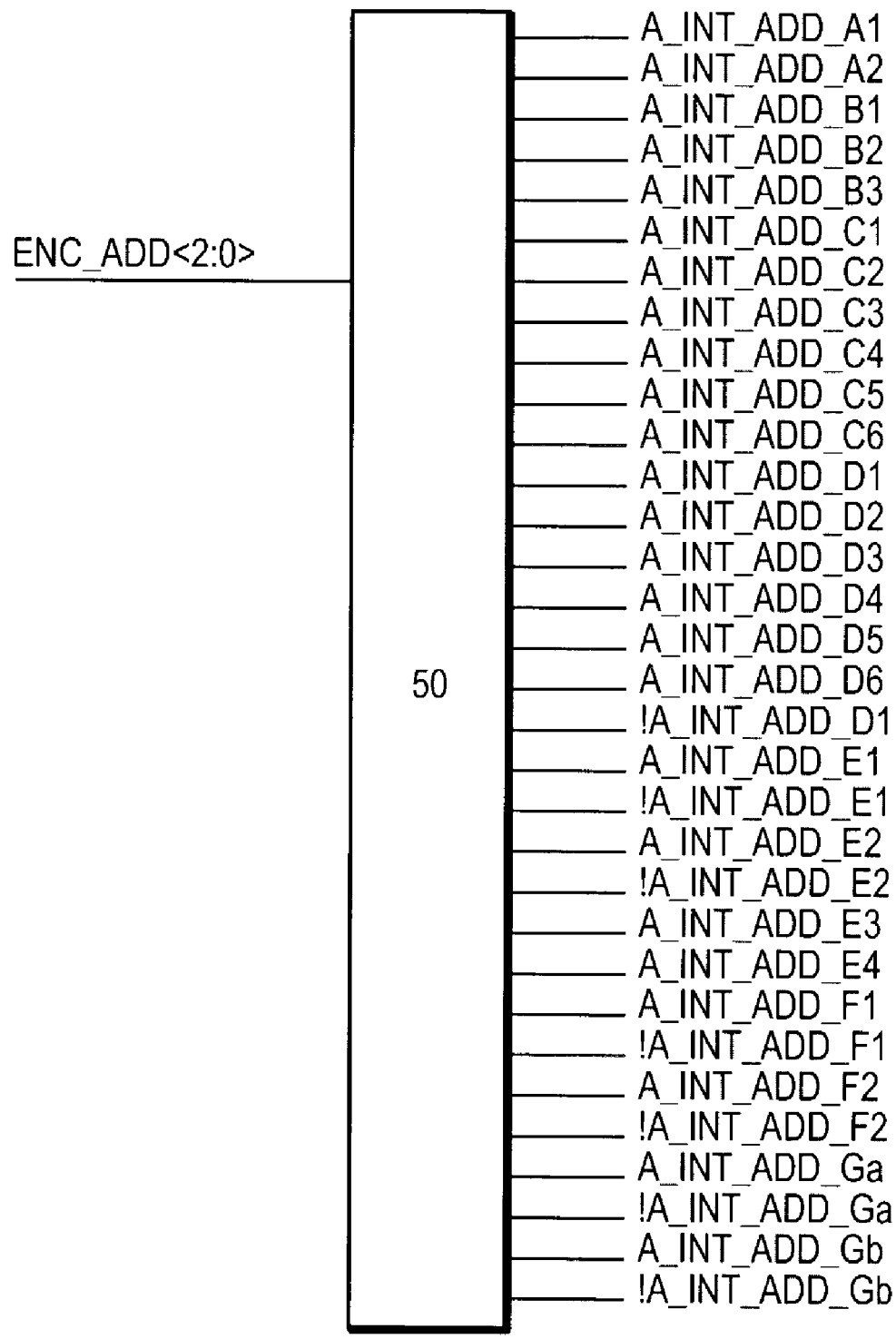
FIG. 12 is a schematic representation of the logic device of FIG. 10 providing duplicate intermediate address bits.
Figure 13:
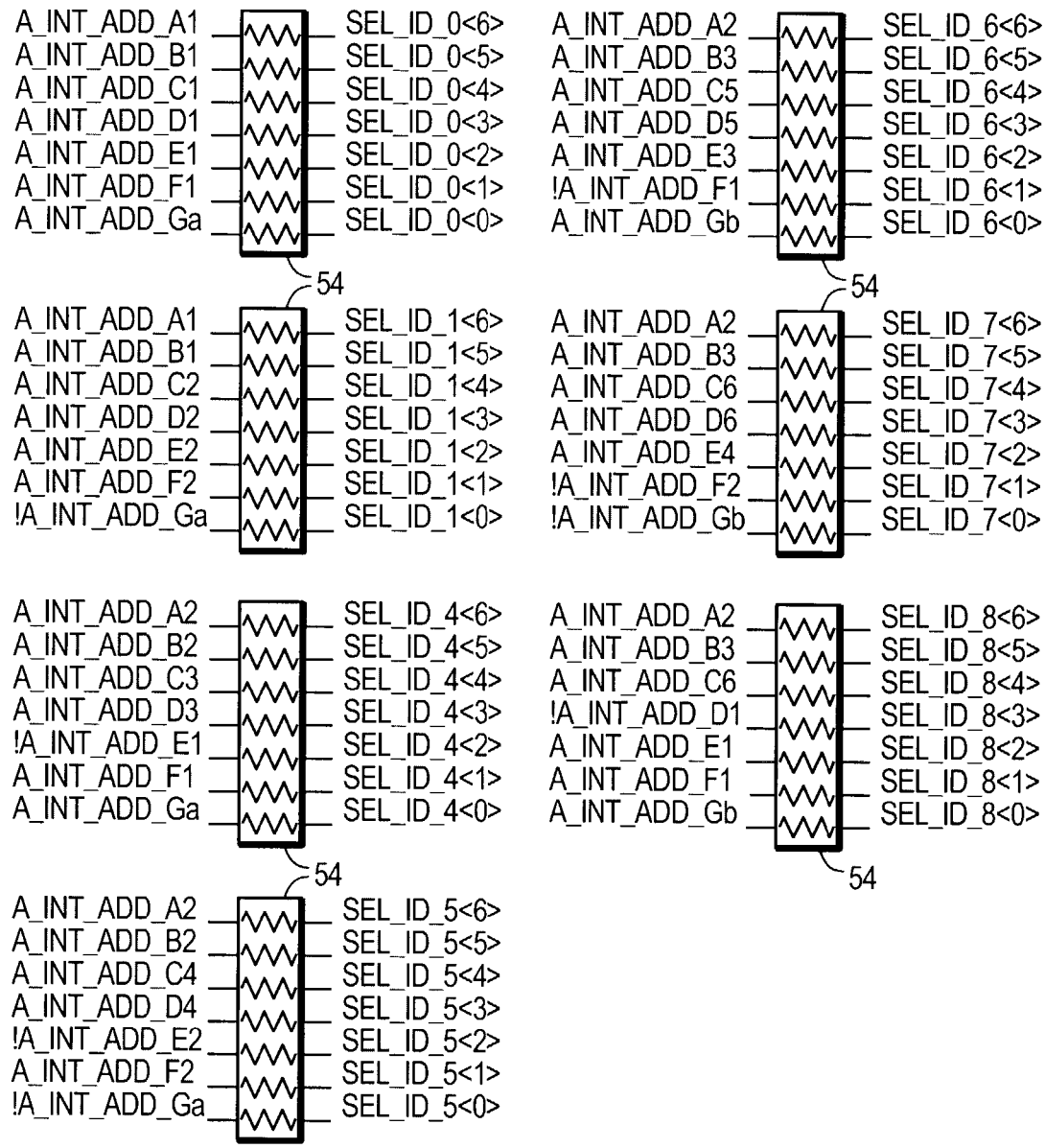
FIG. 13 is a schematic representation showing how the intermediate address bits of FIG. 12 drive the disk drive address bits.

In some designs, a loading analysis might show that the fan-out for each X_INT_ADD bit should be limited so that its corresponding SEL_ID_X bits can in fact be driven in the event of a fault on one of them. In this case, duplicate X_INT_ADD bits can be provided. This causes a small increase in the number of signals that must be routed across the midplane 30. For example, in FIGS. 12 and 13, the A_INT_ADD_G and !A_INT_ADD_G bits have been duplicated to reduce fan-out such that fan-out does not exceed 2. Now SEL_ID_0<0> and SEL_ID_4<0> are driven by A_INT_ADD_Ga, and SEL_ID_6<0> and SEL_ID_8<0> are driven by A_INT_ADD_Gb. Likewise, SEL_ID_1<0> and SEL_ID_5<0> are driven by !A_INT_ADD_Ga, and SEL_ID_7<0> is driven by !A_INT_ADD_Gb. Note that, if fan-out requirement is changed such that fan-out should not exceed three, then !A_INT_ADD_Gb need not be provided, since !A_INT_ADD_G only drives three SEL_ID_X bits.

Figure 15:
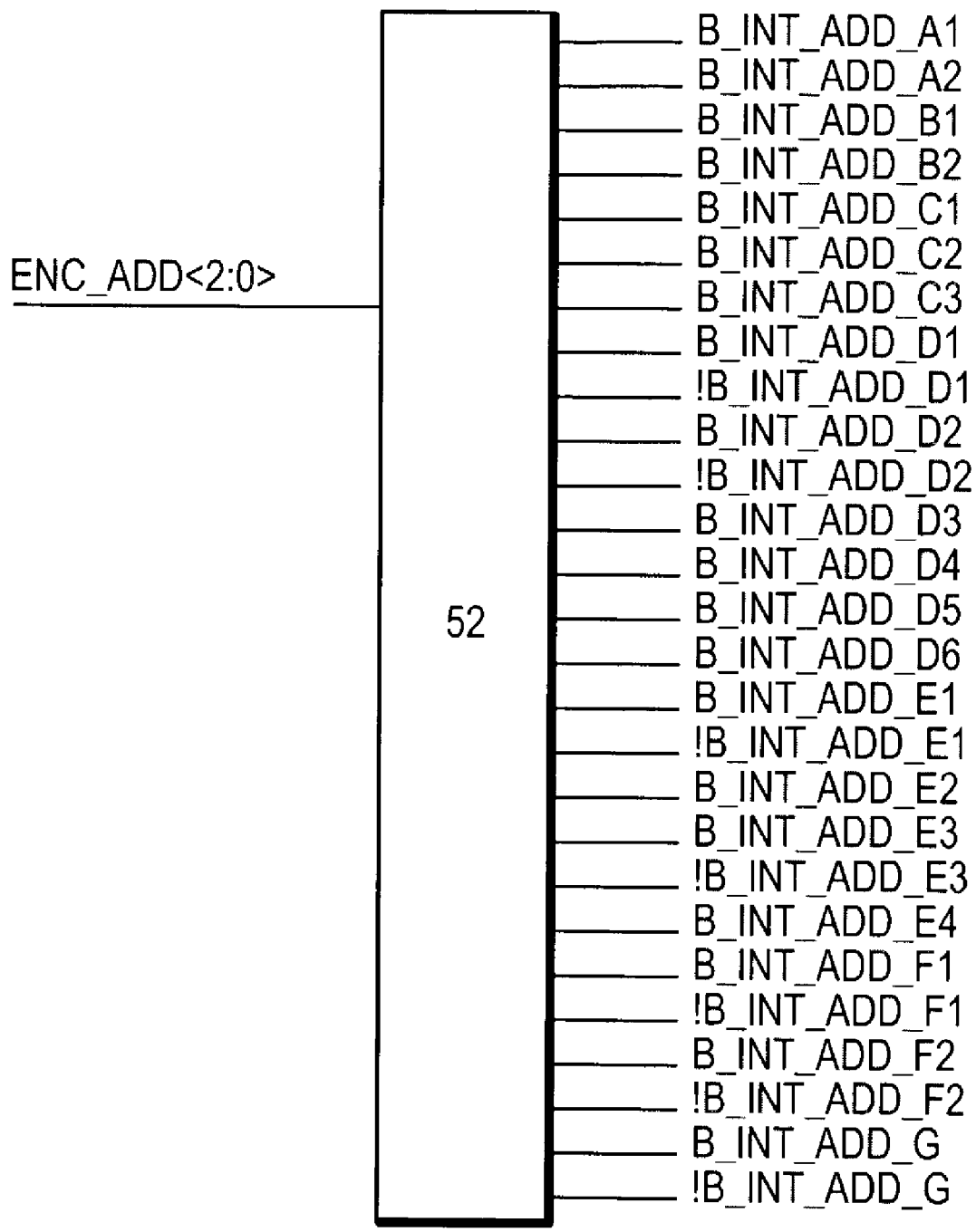
FIG. 15 is a schematic representation of a second logic device producing intermediate address outputs.
Figure 16:
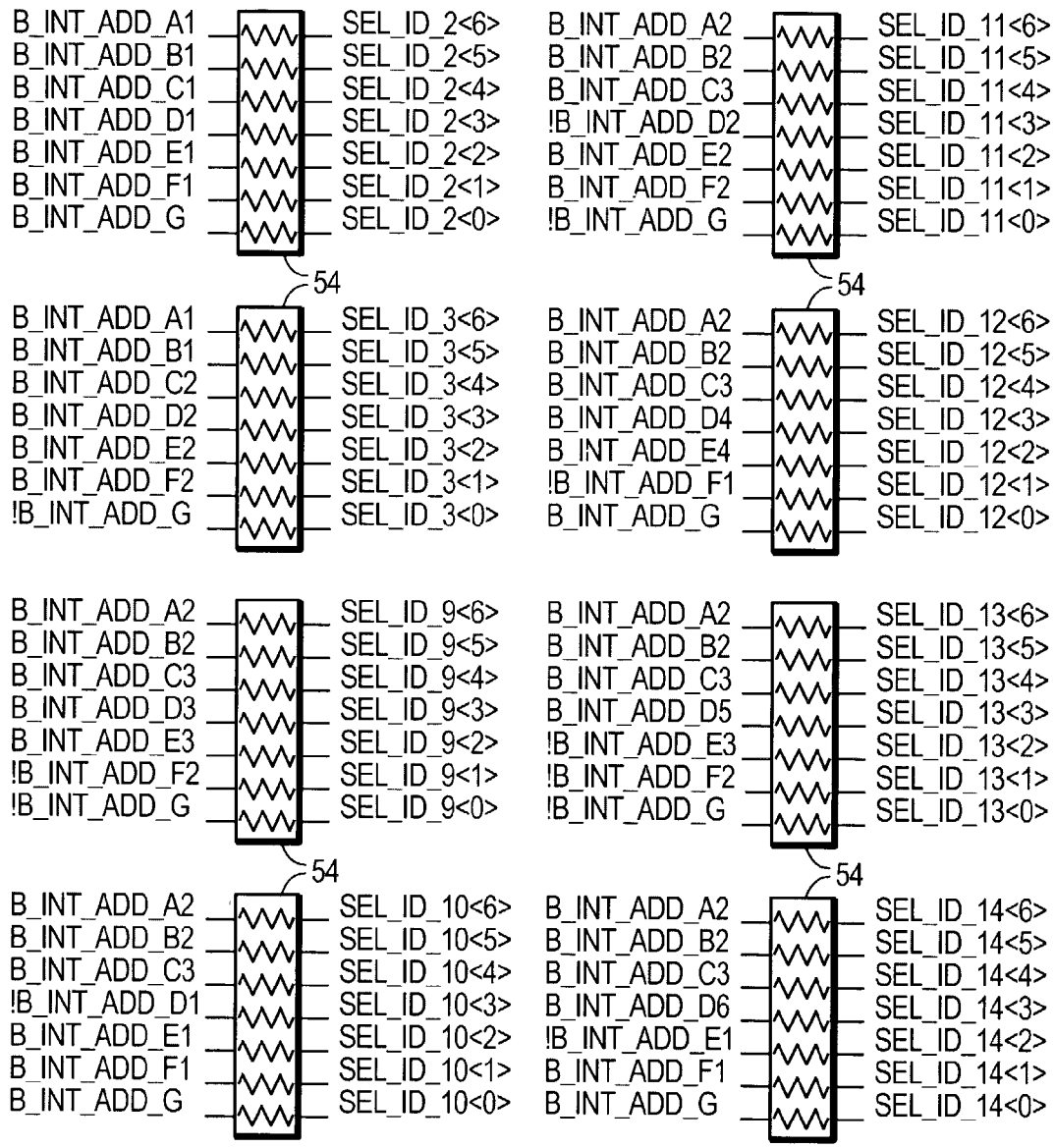
FIG. 16 is a schematic representation showing how the intermediate address bits of FIG. 15 drive the disk drive address bits.
Figure 17:
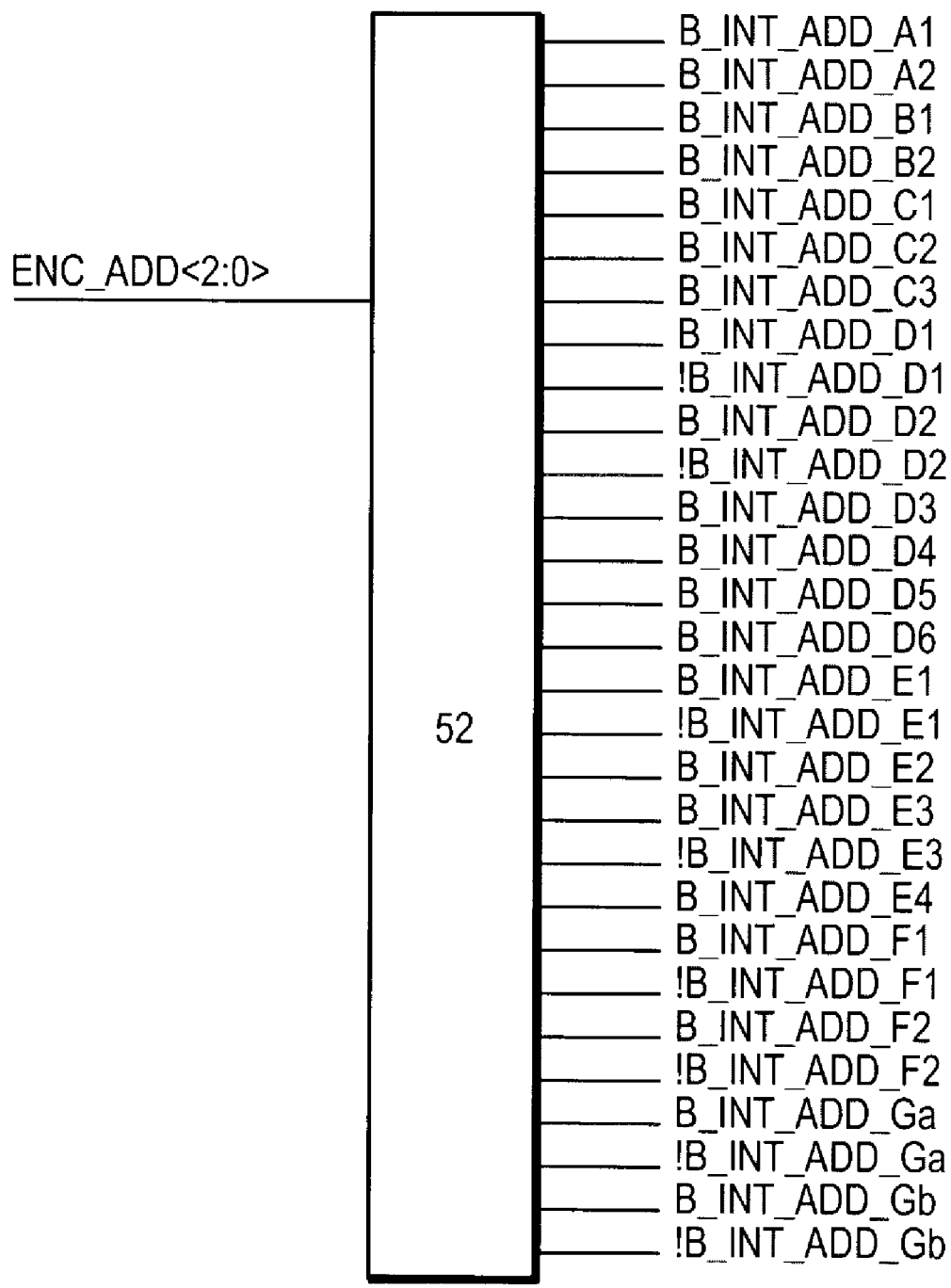
FIG. 17 is a schematic representation of the logic device of FIG. 15 providing duplicate intermediate address bits.
Figure 18:
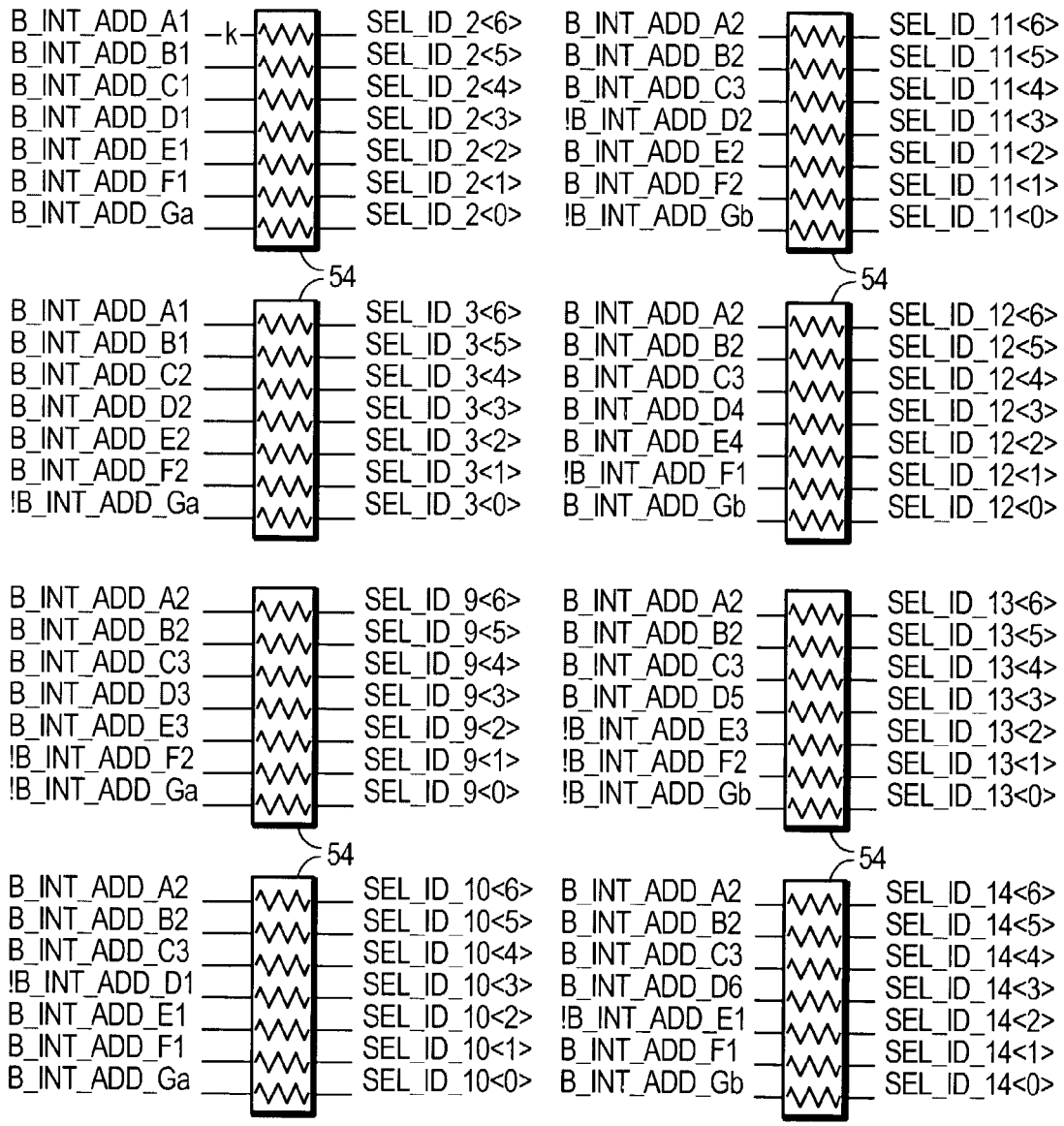
FIG. 18 is a schematic representation showing how the intermediate address bits of FIG. 17 drive the disk drive address bits.

The PLD 52 produces B_INT_ADD<G:A> signals for disk drives 2, 3, and 9-14 in the same manner as was described for PLD 50. In FIG. 14, the chart 4 shows the various binary bit patterns for enclosures 0-7 for each of the disk drives 2, 3, and 9-14. The binary address range from decimal 2, hex 2, for enclosure 0 drive 2, up to decimal 119, hex 77, for enclosure 7 disk 14. The bit patterns for each bit A-G are identified as previously described. The patterns are different for this set of drives. For example, Bit G consists of one pattern and its inverse, and is therefore represented by a single equation G. SEL_ID_2<0>, SEL_ID_10<0>, SEL_ID_12<0>, and SEL_ID_14<0> are driven by B_INT_ADD_G, while SEL_ID_3<0>, SEL_ID_3<0>, SEL_ID_9<0>, SEL_ID_11<0>, and SEL_ID_13<0> are driven by !B_INT_ADD_G. All equations and charts (4-6) shown in FIG. 14 have been produced in exactly the same manner as was described with regard to FIG. 9, based on the patterns existing in chart 6, and so do not require further description. As can be seen in FIG. 15, the outputs B_INT_ADD_A2, B_INT_ADD_B1, B_INT_ADD_B2, B_INT_ADD_C2, B_INT_ADD_C3, B_INT_ADD_D1, !B_INT_ADD_D1, B_INT_ADD_D2, !B_INT_ADD_D2, B_INT_ADD_D3, B_INT_ADD_D4, B_INT_ADD_D5, B_INT_ADD_D6, B_INT_ADD_E1, !B_INT_ADD_E1, B_INT_ADD_E2, B_INT_ADD_E3, !B_INT_ADD_E3, B_INT_ADD_E4, B_INT_ADD_F1, !B_INT_ADD_F1, B_INT_ADD_F2, B_INT_ADD_F2, B_INT_ADD_G, !B_INT_ADD_G are produced by the PLD 52. Thus, the 56 SEL_ID_X bits that are needed to drive the disk drive 2, 3, and 9-14 address lines can be driven by only 25 signals, as seen in FIG. 16. Again, the number of signals required can be further reduced where patterns overlap. For instance, the equations for B_INT_ADD_D2 and B_INT_ADD_E2 match, so one of these signals could be used to drive the corresponding SEL_ID_X bits. Also note that B_INT_ADD_C3 matches B_INT_ADD_G. So, as few as 23 signals can be used to drive the SEL_ID_X bits for drives 2, 3, and 9-14. And, as was previously described for PLD 50, it may be desirable to limit the fan-out on the PLD 52 outputs. In this case, certain outputs might be duplicated. For example, as shown in FIGS. 17 and 18, the 'G' bit is used to produce the B_INT_ADD_Ga and B_INT_ADD_Gb outputs. SEL_ID_2<0> and SEL_ID_10<0> are driven by B_INT_ADD_Ga. SEL_ID_12<0> and SEL_ID_14<0> are driven by B_INT_ADD_Gb. SEL_ID_3<0> and SEL_ID_9<0> are driven by !B_INT_ADD_Ga, while SEL_ID_11<0> and SEL_ID_13<0> are driven by !B_INT_ADD_Gb.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any system where it would be advantageous to provide high availability in a power system or in an addressing scheme. For example, a computing system or server might have multiple copies of software in different areas of memory. Multiple power branches and addressing logic could be provided to access such memory in a highly available manner in accordance with the invention. The logic has been described in terms of certain types of logical functions, yet the skilled artisan will realize that there are many equivalent ways of implementing the described functionality, and that the described signals may be asserted at either a logical '1' or '0' level. Though the preferred embodiment employs a Fibre Channel arbitrated loop architecture, the invention may be deployed with any channel or network protocol. All such modifications are intended to fall within the scope of the following appended claims. Accordingly, the claims set forth below should be construed in view of the full breadth and spirit of the present invention as disclosed herein.

We claim:

1. Apparatus comprising:
  a first device including a first reserved space;
  a second device including a second reserved space;
  a third device including a copy of the first reserved space;
  a fourth device including a copy of the second reserved space, each device having a unique address represented by a separate plurality of address bits;
  a first power branch for providing power to the first device and the second device;
  a second power branch for providing power to the third device and the fourth device; and
  logic for producing intermediate bits, the number of intermediate bits being fewer than the number of address bits, the intermediate bits being used to drive the address bits, some of the intermediate bits driving more than one address bit;
  wherein each device is a Fibre Channel Arbitrated Loop device having an arbitrated loop physical address as the unique address of that device; and
  wherein the apparatus further comprises:
    a programmable logic device coupled to the logic for producing the intermediate bits, the programmable logic device being configured to (i) receive a particular intermediate bit from the logic and (ii) generate multiple arbitrated loop physical address bits belonging to multiple arbitrated loop physical addresses in response to receipt of that particular intermediate bit, each of the multiple arbitrated loop physical address bits belonging to a different arbitrated loop physical address which uniquely corresponds to a particular Fibre Channel Arbitrated Loop device to provide consolidation of addressing in which the particular intermediate bit maps to the multiple arbitrated loop physical address bits.

2. The apparatus of claim 1 wherein the first and second reserved spaces include an operating system.

3. The apparatus of claim 1 wherein the first, second, third, and fourth devices are storage devices.

4. The apparatus of claim 3 wherein:
the first device includes a first management interface;
the second device includes a second management interface;
the third device includes a third management interface; and
the fourth device includes a fourth management interface.

5. The apparatus of claim 4 wherein the first, second, third, and fourth management interfaces can be used for SFF-8067 operations.

6. The apparatus of claim 3 further comprising:
a first plurality of storage devices coupled to the first power branch;
a second plurality of storage devices coupled to the second power branch.

7. The apparatus of claim 6 wherein the first plurality of storage devices and the second plurality of storage devices can be used as a vault LUN.

8. Apparatus comprising:
a plurality of devices, each device having a unique address represented by a separate plurality of address bits;
logic for producing intermediate bits, the number of intermediate bits being fewer than the number of address bits, the intermediate bits being used to drive the address bits, some of the intermediate bits driving more than one address bit;
wherein the logic comprises a first logic device and a second logic device;
wherein the first logic device produces first intermediate bits, the first intermediate bits being used to drive a first set of the address bits, some of the first intermediate bits driving more than one of the first set of address bits; and
wherein the second logic device produces second intermediate bits, the second intermediate bits being used to drive a second set of the address bits, some of the second intermediate bits being used to drive more than one of the second set of address bits.

9. The apparatus of claim 8 wherein the first set of address bits is associated with a first set of the plurality of devices, and wherein the second set of address bits is associated with a second set of the plurality of devices.

10. The apparatus of claim 9 wherein the first intermediate bits drive the first set of address bits through a first set of series resistors, and wherein the second intermediate bits drive the second set of address bits through a second set of series resistors.

11. The apparatus of claim 9 wherein the devices are storage devices.

12. A method comprising the steps of:
providing a first device including a first reserved space;
providing a second device including a second reserved space;
providing a third device including a copy of the first reserved space;
providing a fourth device including a copy of the second reserved space, each device having a unique address represented by a separate plurality of address bits;
providing power to the first device and the second device via a first power branch;
providing power to the third device and the fourth device via a second power branch; and
producing intermediate bits, the number of intermediate bits being fewer than the number of address bits, the intermediate bits being used to drive the address bits, some of the intermediate bits driving more than one address bit;
wherein each device is a Fibre Channel Arbitrated Loop device having an arbitrated loop physical address as the unique address of that device; and
wherein the method further comprises the step of:
generating multiple arbitrated loop physical address bits belonging to multiple arbitrated loop physical addresses in response to receipt of a particular intermediate bit, each of the multiple arbitrated loop physical address bits belonging to a different arbitrated loon physical address which uniquely corresponds to a particular Fibre Channel Arbitrated Loop device to provide consolidation of addressing in which the particular intermediate bit maps to the multiple arbitrated loon physical address bits.

13. The method of claim 12 wherein the step of providing the first device includes the step of providing a first space including a first reserved space including an operating system, and wherein the step of providing the second device includes the step of providing a storage device including a second reserved space including an operating system.

14. The method of claim 12 wherein the first, second, third, and fourth devices are storage devices.

15. The method of claim 14 further including the steps of:
providing a first management interface to the first storage device;
providing a second management interface to the second storage device;
providing a third management interface to the third storage device; and
providing a fourth management interface to the fourth storage device.

16. The method of claim 15 wherein the first, second, third, and fourth management interfaces can be used for SFF-8067 operations.

17. The method of claim 14 further comprising the steps of:
providing power to a first plurality of storage devices via the first power branch;
providing power to a second plurality of storage devices via the second power branch.

18. The method of claim 17 further comprising the step of:
using the first plurality of storage devices or the second plurality of storage devices as a vault LUN.

19. A method comprising the steps of:
providing a plurality of devices, each device having a unique address represented by a separate plurality of address bits; and
producing intermediate bits, the number of intermediate bits being fewer than the number of address bits, the intermediate bits being used to drive the address bits, some of the intermediate bits driving more than one address bit;
wherein the step of producing comprises:
producing first intermediate bits, the first intermediate bits being used to drive a first set of the address bits, some of the first intermediate bits driving more than one of the first set of address bits, and producing second intermediate bits, the second intermediate bits being used to drive a second set of the address bits, some of the second intermediate bits being used to drive more than one of the second set of address bits.

20. The method of claim 19 further comprising the steps of:
coupling the first set of address bits with a first set of the plurality of devices;
coupling the second set of address bits with a second set of the plurality of devices.

21. The method of claim 20 wherein the step of producing first intermediate bits comprises producing first intermediate bits, the first intermediate bits being used to drive a first set of address bits through a first set of series resistors, and wherein the step of producing second intermediate bits comprises producing second intermediate bits being used to drive a second set of address bits through a second set of series resistors.

22. The method of claim 20 wherein the devices are storage devices.

23. Apparatus comprising:
a plurality of devices, each device having a unique address represented by a separate plurality of address bits;
logic for producing intermediate bits, the number of intermediate bits being fewer than the number of address bits, the intermediate bits being used to drive the address bits, some of the intermediate bits driving more than one address bit;
wherein each device is a Fibre Channel Arbitrated Loop device having an arbitrated loop physical address as the unique address of that device; and
wherein the apparatus further comprises:
a programmable logic device coupled to the logic for producing the intermediate bits, the programmable logic device being configured to (i) receive a particular intermediate bit from the logic and (ii) generate multiple arbitrated loop physical address bits belonging to multiple arbitrated loop physical addresses in response to receipt of that particular intermediate bit, each of the multiple arbitrated loop physical address bits belonging to a different arbitrated loop physical address which uniquely corresponds to a particular Fibre Channel Arbitrated Loop device to provide consolidation of addressing in which the particular intermediate bit maps to the multiple arbitrated loop physical address bits.

24. A method comprising the steps of:
providing a plurality of devices, each device having a unique address represented by a separate plurality of address bits; and
producing intermediate bits, the number of intermediate bits being fewer than the number of address bits, the intermediate bits being used to drive the address bits, some of the intermediate bits driving more than one address bit;
wherein each device is a Fibre Channel Arbitrated Loop device having an arbitrated loop physical address as the unique address of that device; and
wherein the method further comprises the step of:
generating multiple arbitrated loop physical address bits belonging to multiple arbitrated loop physical addresses in response to receipt of a particular intermediate bit, each of the multiple arbitrated loop physical address bits belonging to a different arbitrated loop physical address which uniquely corresponds to a particular Fibre Channel Arbitrated Loop device to provide consolidation of addressing in which the particular intermediate bit maps to the multiple arbitrated loop physical address bits.

* * * * *